(12) United States Patent
Kutsko et al.

(10) Patent No.: US 11,102,341 B1
(45) Date of Patent: Aug. 24, 2021

(54) MOBILE PHONE CASE WITH DRINKING APPARATUS

(71) Applicants: Stefan Ross Kutsko, Charleston, SC (US); Kayla Marie Gagnon, Rochester, NY (US)

(72) Inventors: Stefan Ross Kutsko, Charleston, SC (US); Kayla Marie Gagnon, Rochester, NY (US)

(73) Assignees: Stefan Ross Kutsko, Charleston, SC (US); Kayla Marie Gagnon, Rochester, NY (US)

( * ) Notice: Subject to any disclaimer, the term of this patent is extended or adjusted under 35 U.S.C. 154(b) by 0 days.

(21) Appl. No.: 16/690,291

(22) Filed: Nov. 21, 2019

Related U.S. Application Data

(60) Provisional application No. 62/770,204, filed on Nov. 21, 2018.

(51) Int. Cl.
| | |
|---|---|
| *H04M 1/21* | (2006.01) |
| *H04B 1/3888* | (2015.01) |
| *A45C 11/00* | (2006.01) |
| *B08B 9/04* | (2006.01) |
| *A45C 13/02* | (2006.01) |
| *A47G 21/18* | (2006.01) |

(52) U.S. Cl.
CPC ............. *H04M 1/21* (2013.01); *A45C 11/00* (2013.01); *A45C 13/02* (2013.01); *B08B 9/04* (2013.01); *H04B 1/3888* (2013.01); *A45C 2011/002* (2013.01); *A47G 21/18* (2013.01)

(58) Field of Classification Search
CPC .... H04B 1/3888; H04M 1/02; H04M 1/0202; H04M 1/0254; H04M 1/026; G01N 21/78
See application file for complete search history.

(56) References Cited

U.S. PATENT DOCUMENTS

| | | | |
|---|---|---|---|
| 2017/0019512 A1* | 1/2017 | Guerdrum | ................ A45F 5/00 |
| 2017/0026498 A1* | 1/2017 | Goldfain | ............... H04M 1/185 |
| 2018/0069585 A1* | 3/2018 | Azodi | .................... A45D 34/06 |
| 2019/0260411 A1* | 8/2019 | Langhans | ............. A61M 5/002 |
| 2019/0313820 A1* | 10/2019 | Pepper | ................. A47G 21/186 |

* cited by examiner

*Primary Examiner* — Blane J Jackson
(74) *Attorney, Agent, or Firm* — Amin, Turocy & Watson, LLP

(57) ABSTRACT

A protective casing is enabled. For instance, a straw storage apparatus comprises a straw container configured to attach to a mobile phone or a mobile phone case and a chamber within the straw container configured to removably receive a straw.

18 Claims, 30 Drawing Sheets

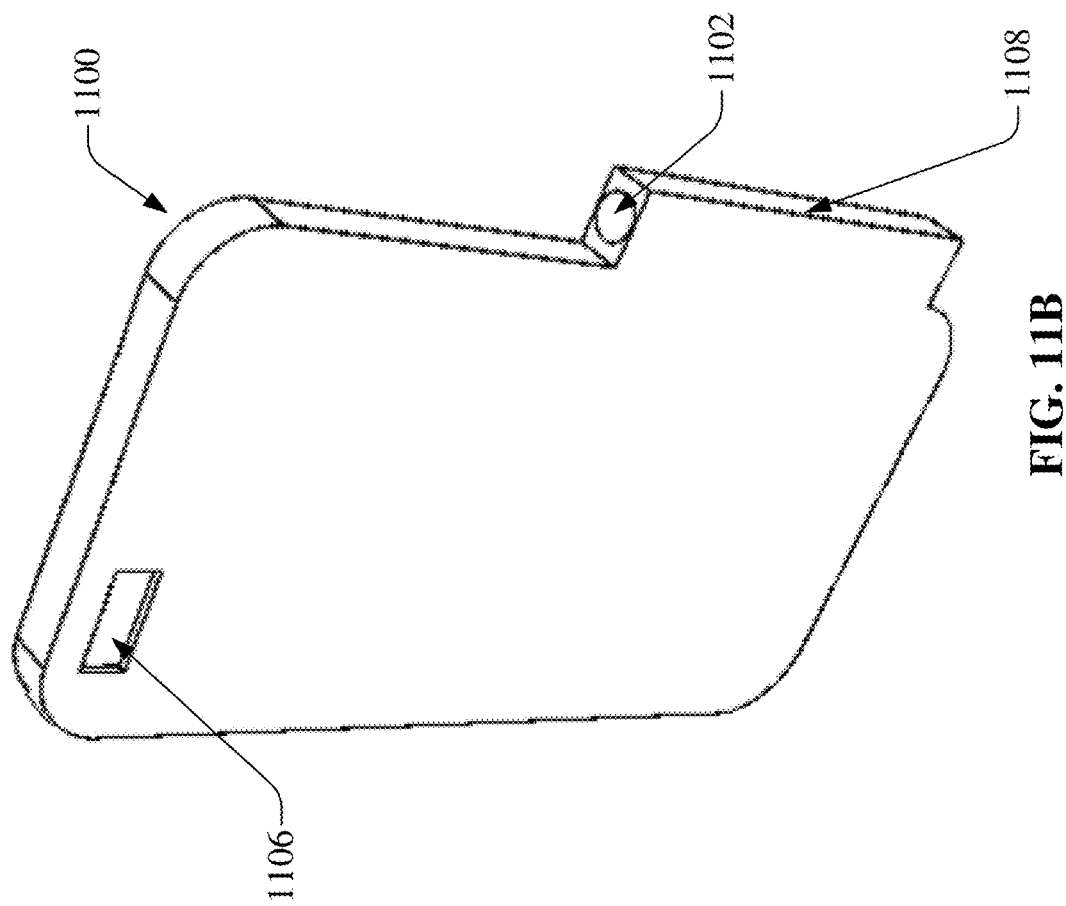
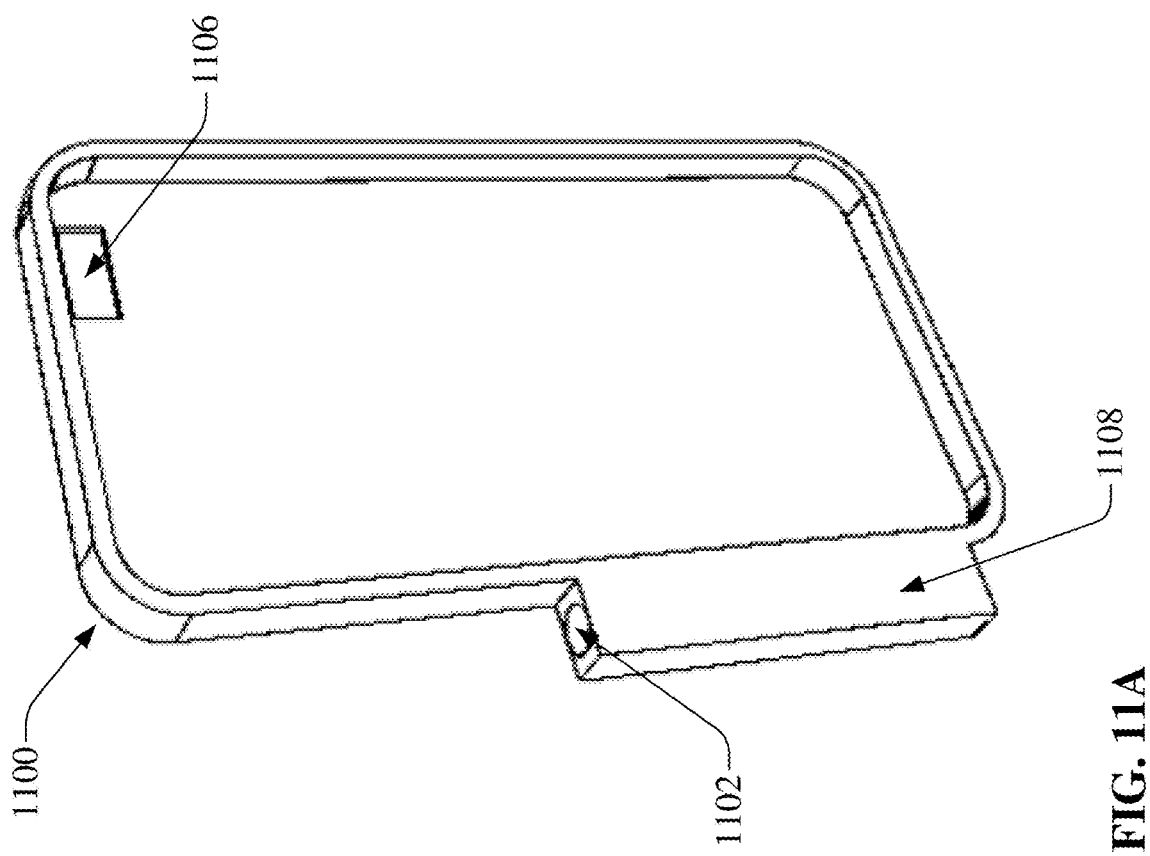
FIG. 11B
FIG. 11A

MOBILE PHONE CASE WITH DRINKING APPARATUS

CROSS REFERENCE TO RELATED APPLICATION

This application claims priority to U.S. Provisional application Ser. No. 62/770,204, filed Nov. 21, 2018, the entirety of which is hereby incorporated by reference.

TECHNICAL FIELD

The present disclosure generally relates to drinking apparatus containers.

BACKGROUND

By way of brief background, people worldwide are becoming increasingly concerned about single-use plastic products, particularly plastic straws. The general public was recently captivated by a marine biologist who discovered a plastic straw stuck in a sea turtle's nose in August 2015. Ever since, efforts to reduce the use of plastic straws have gained momentum. With movements like The Last Plastic Straw and the Plastic Pollution Coalition, more and more people are looking for alternatives to single-use plastic products. Some businesses and municipalities have even begun to ban the use and distribution of single-use plastic straws. Along with habit, convenience is a key factor in the consumption of plastic straws. The majority of single-use plastic straws are used and disposed of when a person is outside of their home, whether it is in a restaurant, at an event, or in their car.

According to a study conducted by the Pew Research Center, 95% of Americans own a cell phone and 77% of those are smart phones, up 35% from 2011. Among those smart phone users, 82% of males and 90% of females claim that they use a case to protect their mobile phone, according to Business Insider. With numerous resources and advanced technology now at our fingertips, cell phones (and their cases) have become an item that is as important to have when leaving the house as our car keys and wallet. In fact, the cell phone may already be the most important item a person can bring, as it is already replacing the wallet and the key.

SUMMARY

The following presents a simplified summary of the specification in order to provide a basic understanding of some aspects of the specification. This summary is not an extensive overview of the specification. It is intended to neither identify key or crucial elements of the specification nor delineate the scope of any particular implementations of the specification, or any scope of the claims. Its purpose is to present some concepts of the specification in a simplified form as a prelude to the more detailed description that is presented in this disclosure.

The embodiments disclosed herein overcome the shortcomings of the prior art by providing a straw container configured to attach to a mobile phone or a mobile phone case and a chamber within the straw container configured to removably receive a straw, while preserving functionality inherent to the mobile phone. Where people can possess a reusable straw without any added inconvenience, plastic consumption can be reduced, waste can be prevented, ecosystems can be better protected and potentially, lifeforms such as the sea turtle can be saved.

In one embodiment, the disclosure provides a straw storage apparatus containing a straw container configured to attach to a mobile phone or a mobile phone case; and a chamber within the straw container configured to removably receive a straw.

In another embodiment, the disclosure provides a protective casing containing a first case configured to receive a mobile phone and a first attachment mechanism disposed on the first case for engagement with a second case, where the second case comprises a first chamber configured to accommodate a first straw component.

In yet another embodiment, the disclosure provides a case for transporting a straw contained within a case body. A chamber is disposed within the case body and is configured to receive the straw. A living hinge is at a first end of the case body. A lid is attached to the living hinge and is configured to protectably cover the straw and the chamber when the lid is in a closed position. An attachment slot is configured to receive a slider rail.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF DRAWINGS

Numerous aspects, implementations and advantages of the present invention will be apparent upon consideration of the following detailed description, taken in conjunction with the accompanying drawings, in which like reference characters refer to the like parts throughout, and in which:

FIG. 11A and FIG. 11B are perspective views of a mobile phone case in accordance with various aspects disclosed herein;

DETAILED DESCRIPTION

Figure 1:
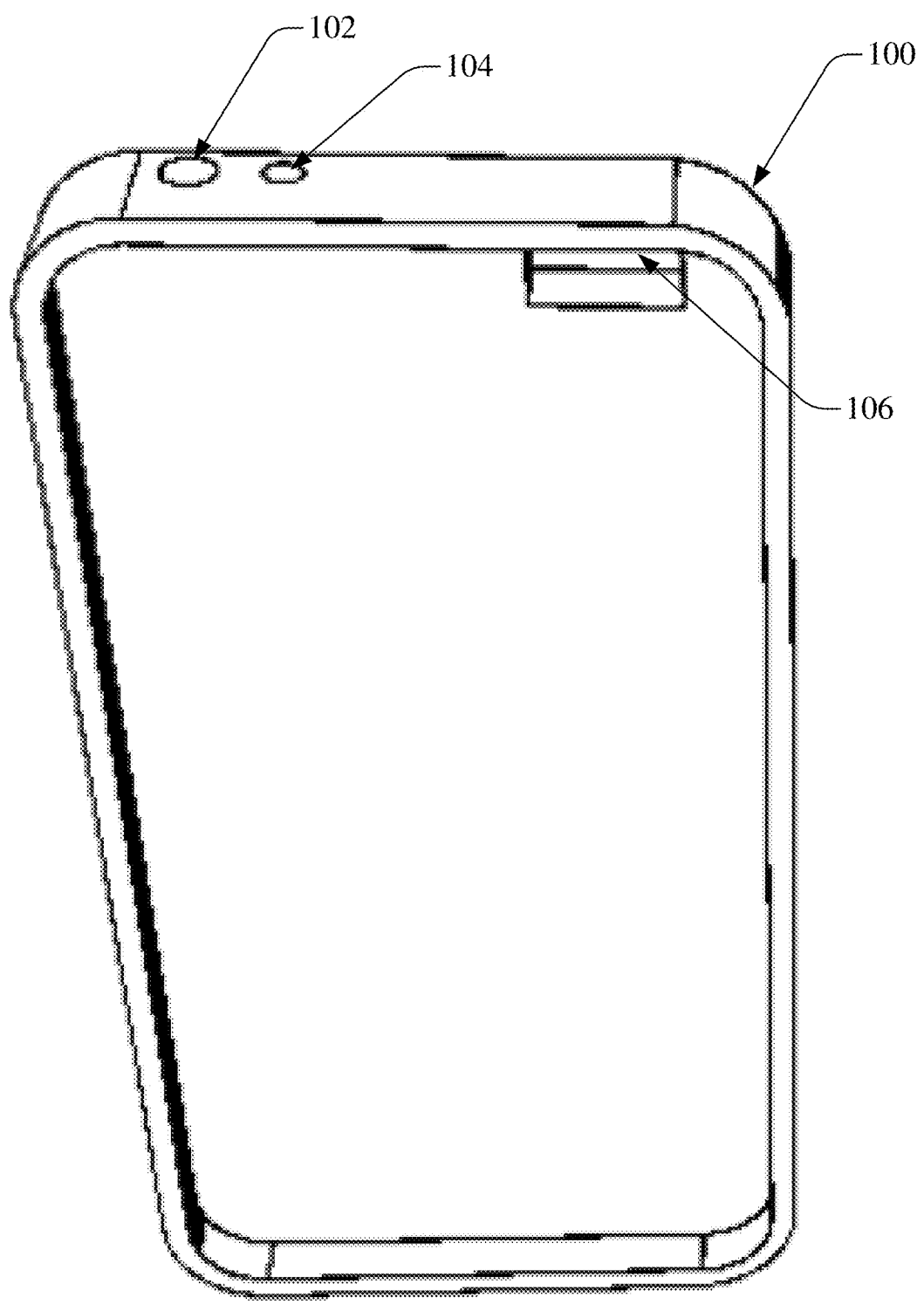
FIG. 1 is a perspective view of a mobile phone case in accordance with various aspects disclosed herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Figure 2:
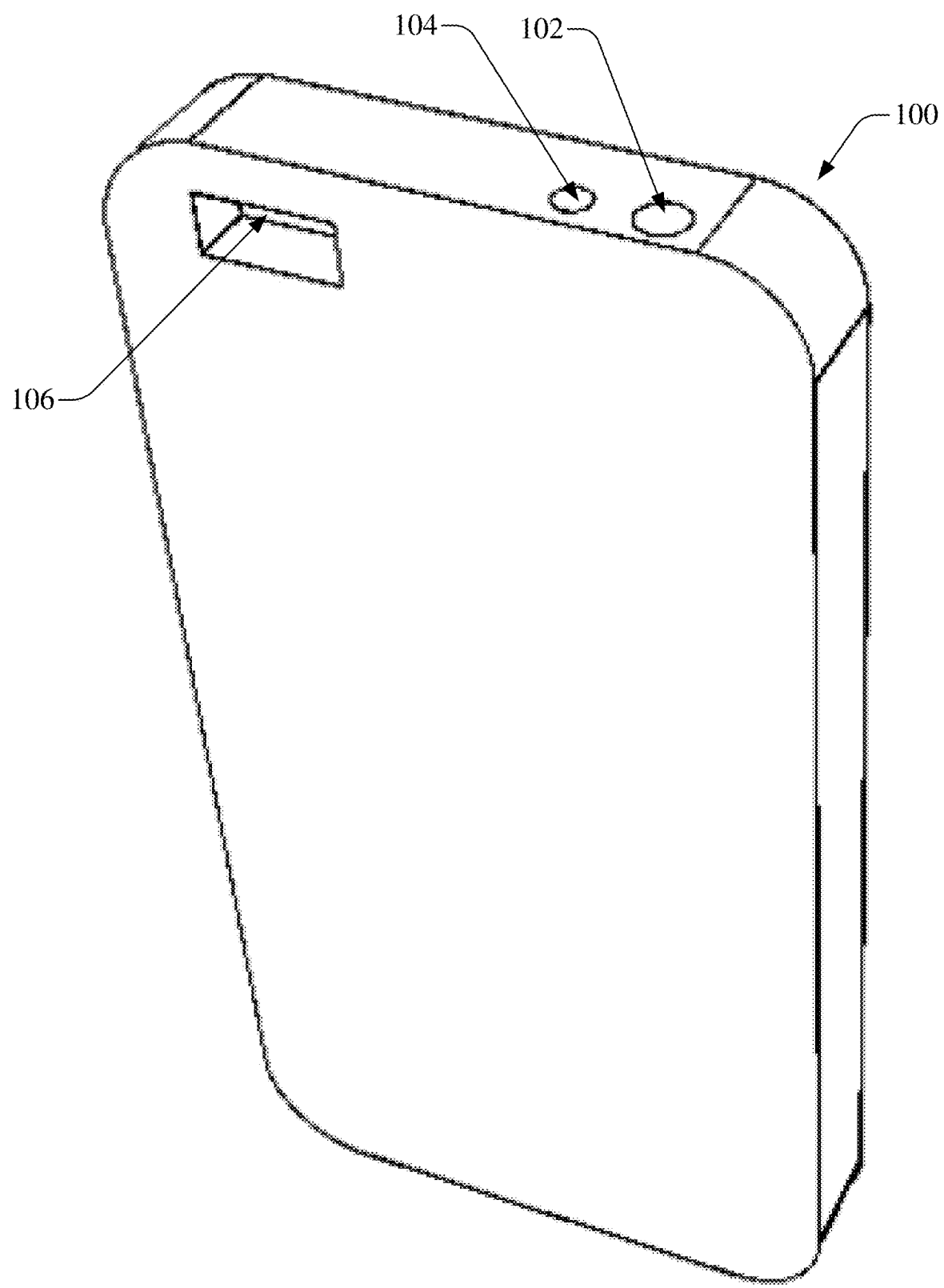
FIG. 2 is a perspective view of a mobile phone case in accordance with various aspects disclosed herein.

Referring now to FIGS. 1 and 2, there is illustrated a non-limiting mobile phone case 100 in accordance with one or more embodiments described herein. The case 100 can be configured to for use with virtually any mobile device, including an Apple® iPhone®, Google Android® device, smartphone, cell phone, PDA, or calculator among others. The case 100 can be configured for each device or can be a universal-type case. The case 100 can comprise a plurality of openings 106 for maintaining inherent functionality of the mobile phone such as a camera, microphone, buttons, or other functions. The case 100 can comprise at least one of a variety of materials including, but not limited to, recycled materials, non-recycled materials, antimicrobial materials, food grade materials, polycarbonate, polyurethane, leather, vinyl, silicon, TPU, rubberized materials, metal, etc.

As shown in FIGS. 1 and 2, a chamber 102 is depicted. A plurality of chambers 102 can be disposed on the case 100, though FIGS. 1 and 2 only depict one chamber 102. Chamber 102 is used for storing a drinking apparatus, more particularly a straw. A straw can be removed and reinserted into the chamber 102, thus allowing for the reuse of the straw. In an embodiment, a straw is held within a chamber 102 by friction between the straw and chamber 102. Though depicted as a round opening, chamber 102 can comprise other shapes to accommodate a variety of straws. For example, a round chamber 102 can correspond to a cylindrically-shaped straw. In another example, a square or rectangular chamber 102 can correspond to a rectangularly-shaped straw. In yet another example, a rectangular chamber 102 can receive a cylindrically-shaped straw and so on.

Figure 3:
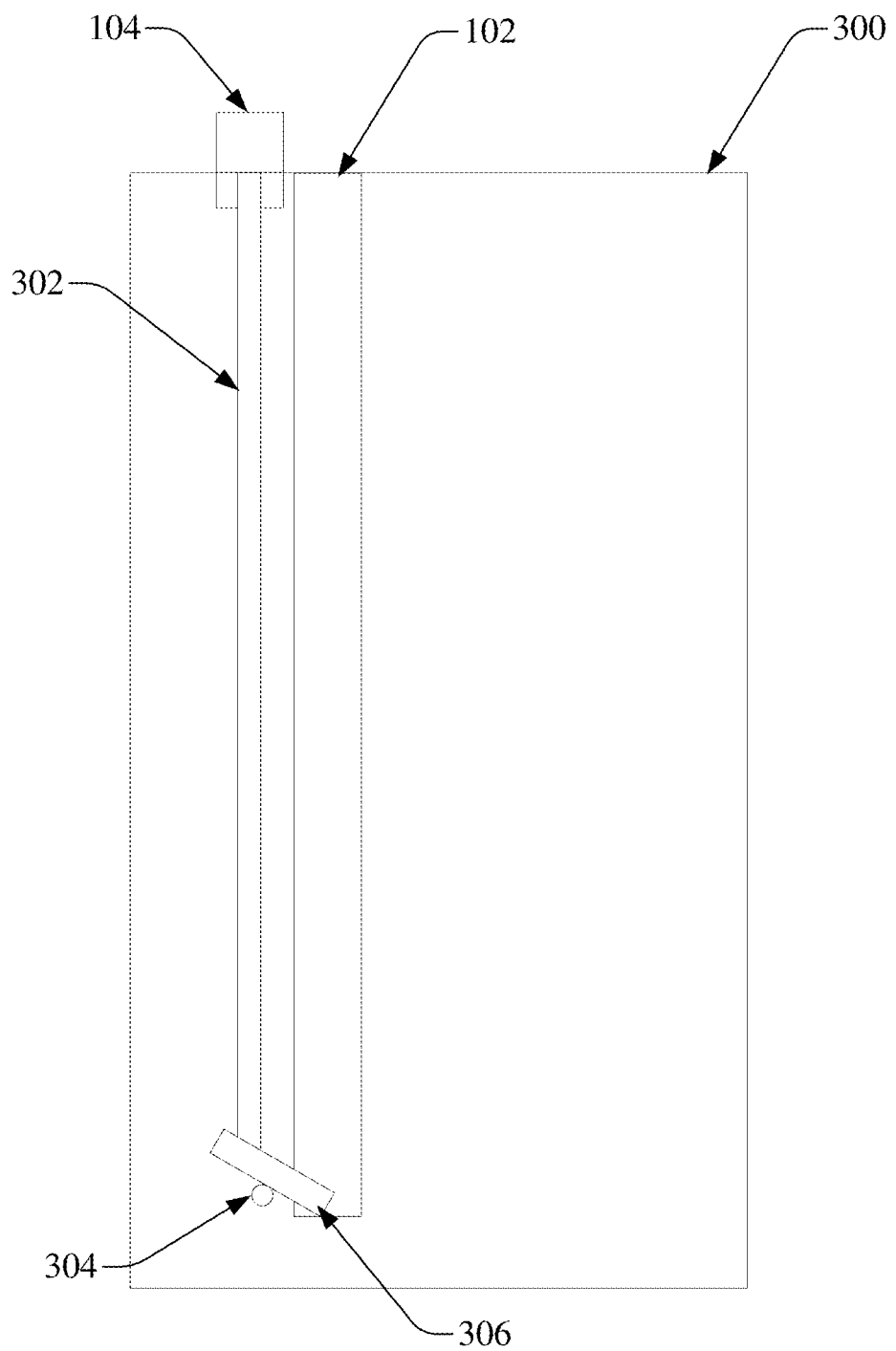
FIG. 3 is a section view of a mobile phone case in accordance with various aspects disclosed herein.

In an embodiment, a release button 104 is depicted. The release button 104 is an optional component of case 100. As shown in FIG. 3, a cross-sectional view of a case 300 containing the release button 104 can be mechanically coupled, within and hidden by the exterior of the case, to a plunger mechanism inside of the chamber 102. The button 104 can be coupled to a rod 302 which can depress a plunger 306. The plunger 306 can be cantilevered about a hinge 304. This way, the plunger 306 can be used as actuated by the button 104, to push the straw out of the chamber 102, so that a user can fully remove the straw for convenient use.

In other embodiments, the release button 104 can be electronically coupled to a plunger 306. This way, though there is no mechanical linkage between the release button 104 and plunger 306 and actuation of the release button 104 can send a signal to the plunger 306. The case 300 can comprise a motor to accordingly engage the plunger to push the straw out of the chamber 102.

Figure 4:
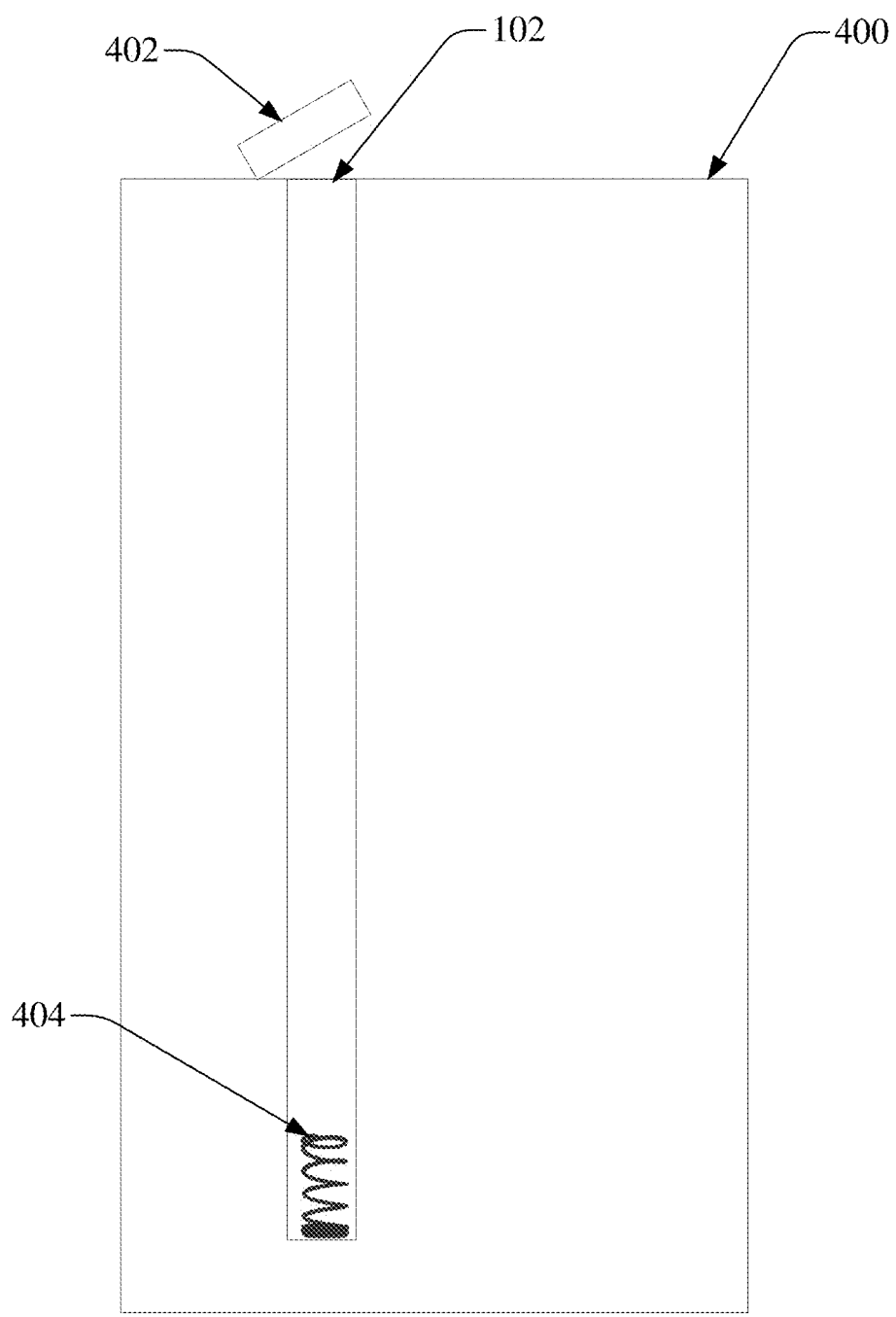
FIG. 4 is a section view of a mobile phone case in accordance with various aspects disclosed herein.

Referring now to FIG. 4, a cross-section of a case 400 is depicted. In this embodiment, a cap 402 and spring 404 can be used to retain a straw within the chamber 102 the case 400. The cap 402 can include a living hinge and utilize at least one of a variety of attachment means, such as a snap-lock. The closure of cap 402 can retain a straw within the case 400, and the spring 404 can ensure that the straw is propelled out of the case when the cap 402 is opened.

In an embodiment, the chamber 102 contains a spring 404 for pushing a straw out of the chamber 102. The straw can be removably secured in the chamber 102 by the cap 402. The spring 404 is not strong enough to overcome the closure of the cap 402 without user intervention. This way, the spring 404 will propel the straw partially out of the chamber 102 after the cap 402 is opened. Additionally, a user can close the cap 402 over the straw, pushing the straw fully into the chamber 102 and securing storing the straw within the chamber 102, ready to be again released by a user opening the cap 402.

Figure 5:
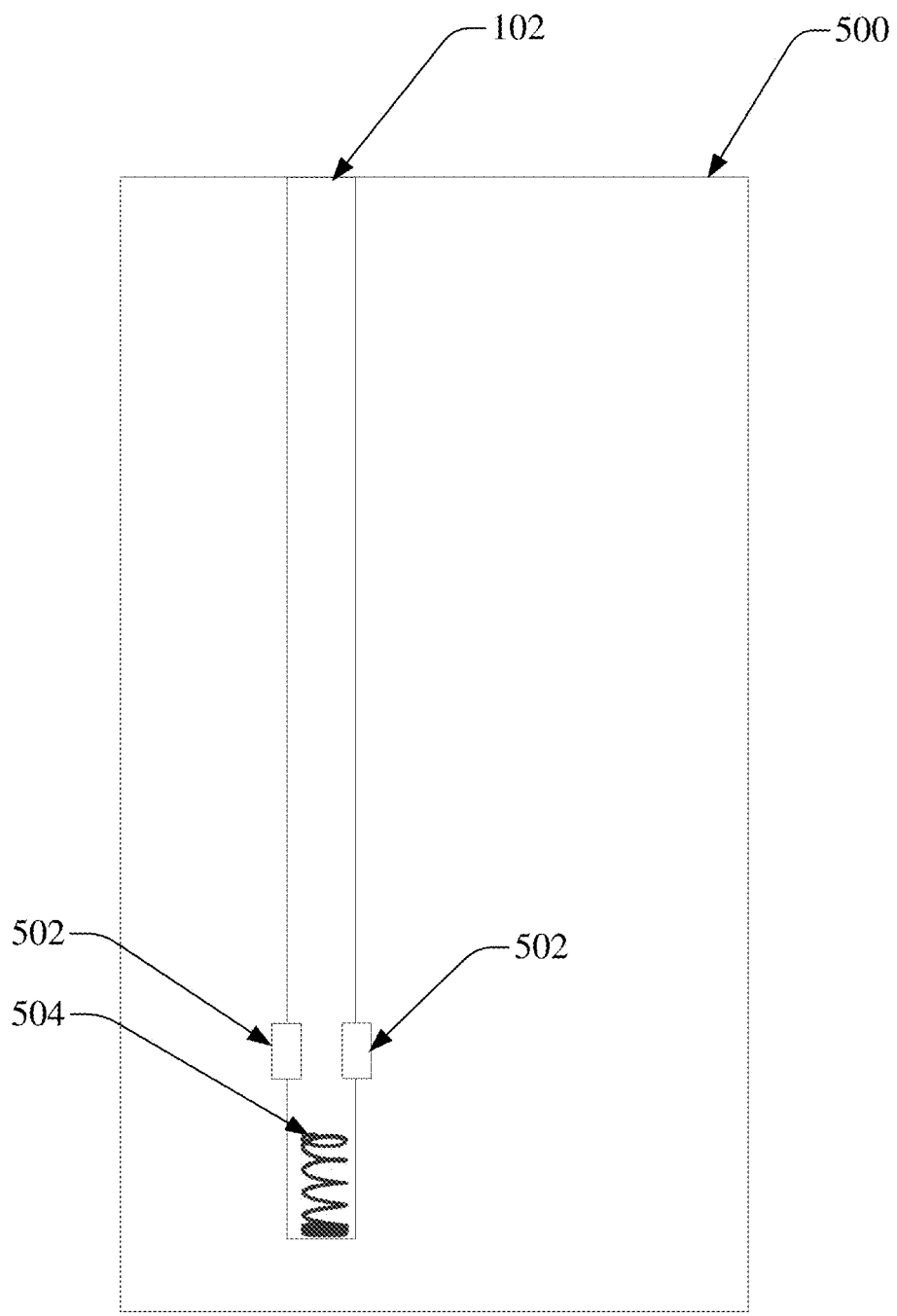
FIG. 5 is a section view of a mobile phone case in accordance with various aspects disclosed herein.

Referring now to FIG. 5, a cross-section of a case 500 is depicted. A reusable straw can be removably secured in the chamber 102 by a click lock or a click-release mechanism. In this embodiment, pressing the straw fully into the chamber 102 can secure the straw within the chamber 102 by increased friction from retainers 502 or other securing means. The retainers 502 can move inward or outward (towards or away from the straw) to increase or reduce friction, respectively, in response to the insertion or release of the straw. Pressing the straw in again can release the straw and push the straw out of the chamber 102 so that a user can fully remove the straw. A spring 504 can be used to propel the straw out of the chamber 102 when the friction from retainers 502 is overcome.

Figure 6:
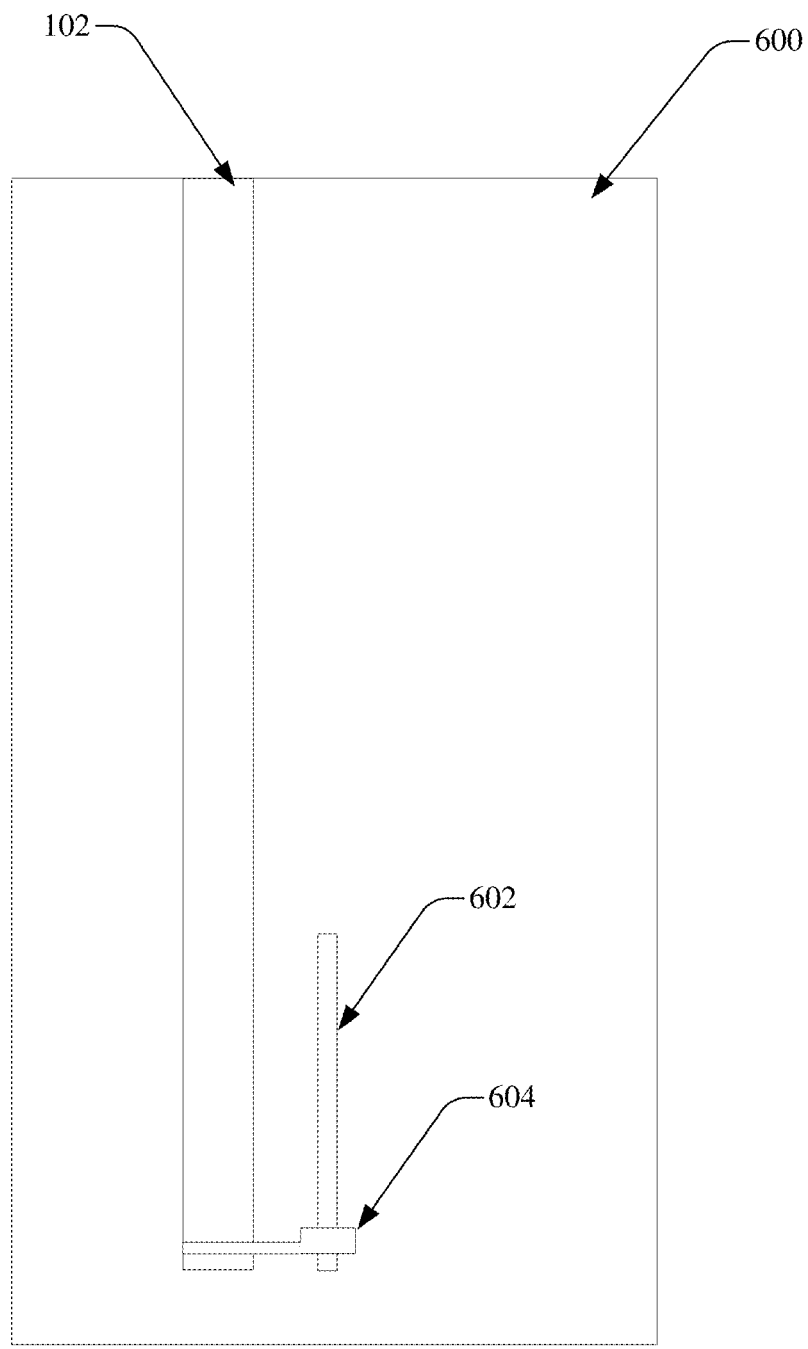
FIG. 6 is a section view of a mobile phone case in accordance with various aspects disclosed herein.

Referring now to FIG. 6, a cross section of a case 600 is depicted. A slot 602 can be received through a surface of the case 600. The slot 602 can be parallel to the chamber 102. A slider 604 can be slidably coupled to case 600 via the slot 602. The slider 604 can have an exposed portion protruding through an exterior of the case 600 and an interior portion received within the chamber 102. Thus, a user can move the slider 604 by sliding the exposed portion of the slider 604 whereby the interior portion of the slider 604 can move correspondingly. Thus, in the case of a straw being removably received within the chamber 102, sliding the slider 604 can push the straw out of the chamber 102. The slider 604 can be movably restrained within the slot 602 by friction between the slider 604 and the slot 602 of the case 600 or other components. In other embodiments, the slider 604 can be movably retrained within the slot 602 by spring(s) or other mechanisms or methods.

Figure 7:
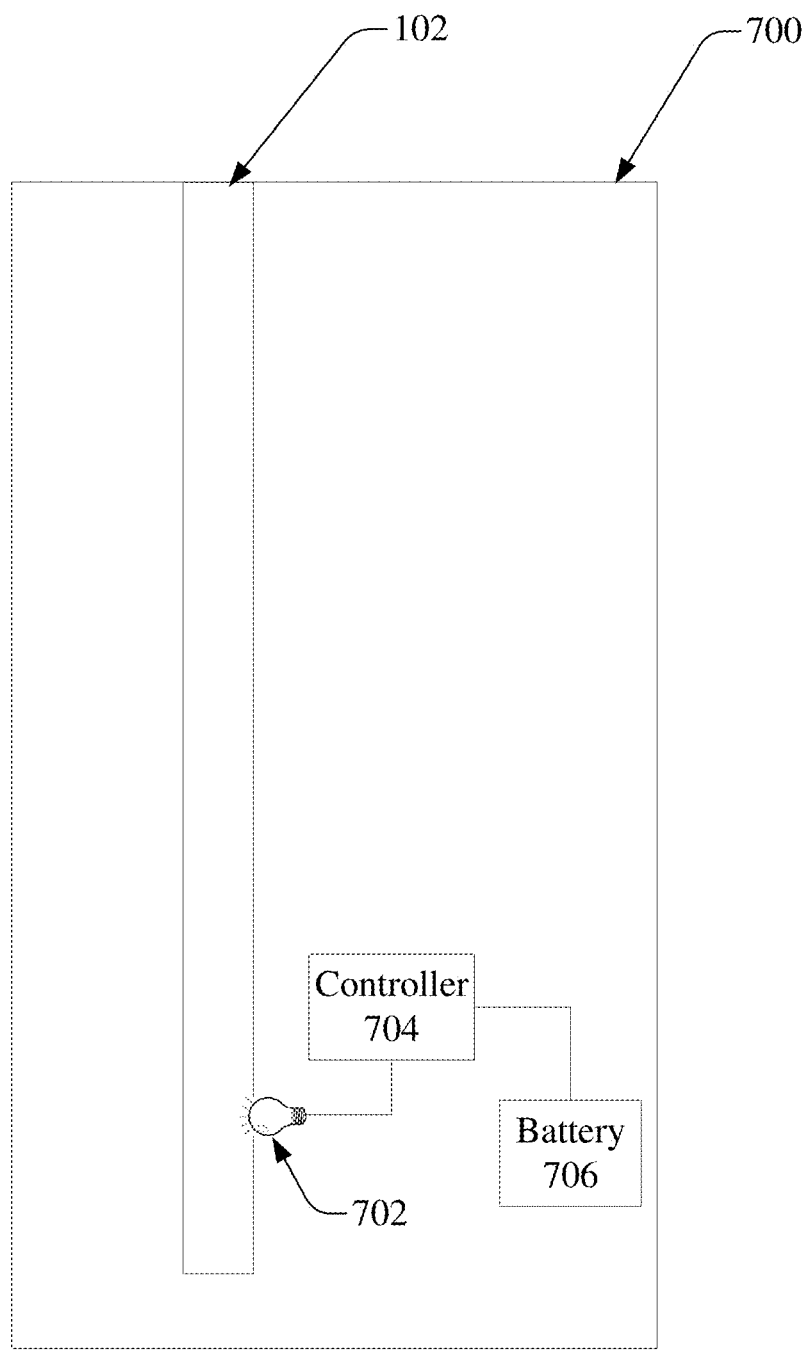
FIG. 7 is a section view of a mobile phone case in accordance with various aspects disclosed herein.

Referring now to FIG. 7, in yet another embodiment, a cross-section of a case 700 is depicted. A UV light 702 can be disposed within the chamber 102. The UV light can be used to sterilize the reusable straw while the straw is inserted into the chamber 102. The UV light can also sterilize the chamber 102. A sensor can be incorporated so that the UV light 702 only illuminates for a specific period of time or in response to the insertion or removal of a straw. A sensor, separate from the UV light 702, can also be utilized. In another embodiment, the UV light can be activated by pressing a button. The UV light can be powered by a battery 706 internal to the case 700 or can be powered by a mobile phone to which the case 700 is coupled. A controller 704 can control the operations of the UV light 702.

Figure 8:
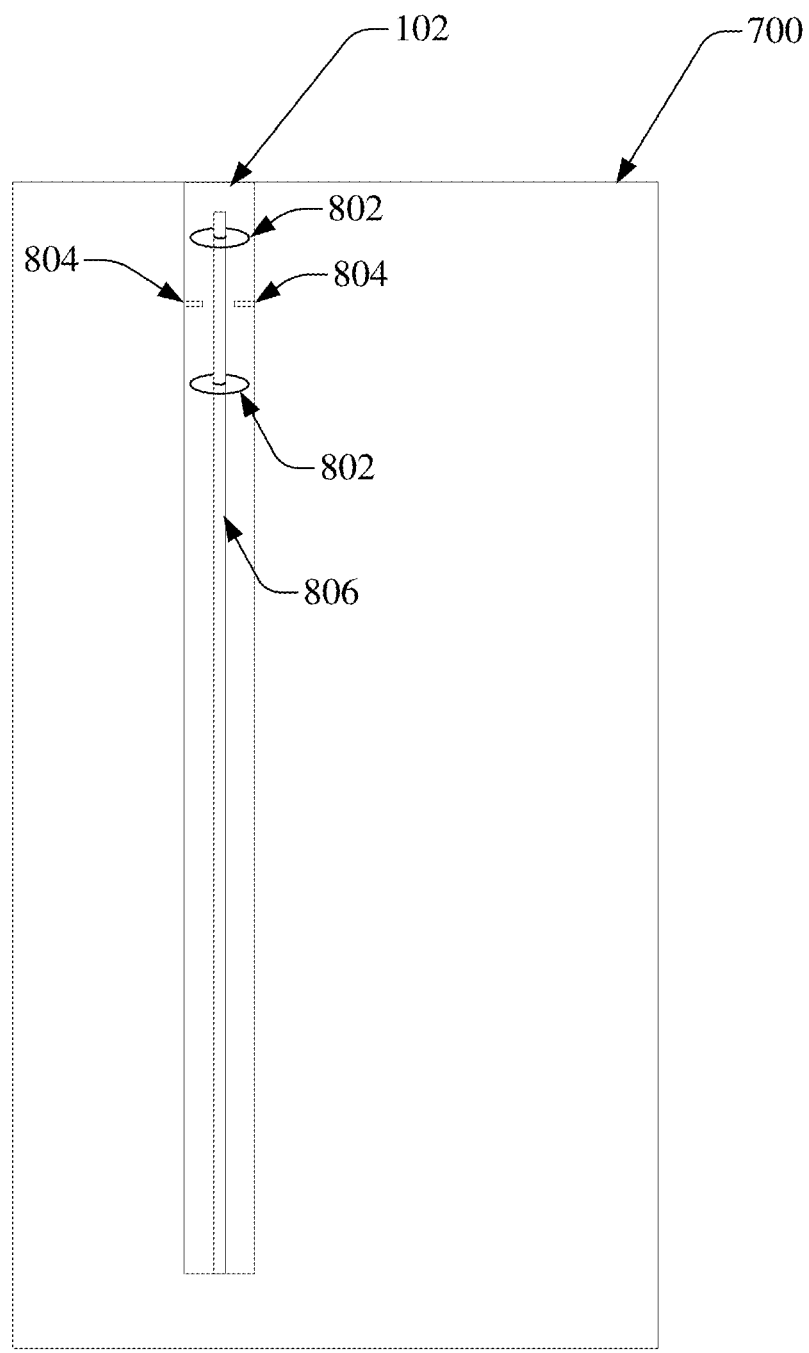
FIG. 8 is a section view of a mobile phone case in accordance with various aspects disclosed herein.

Referring now to FIG. 8, a cross-section of a case 800 is depicted. The chamber 102 can contain food-grade silicon squeegee discs 802 and squeegees 804 for cleaning the straw when it is inserted into the chamber 102. The squeegee discs 802 and squeegees 804 can comprise other suitable materials safe for cleaning a straw. Squeegees 804 can be disposed in the interior wall of the chamber 102. This way, squeegees 804 can clean the exterior of the straw. Rod 806 can be disposed concentric to the chamber 102, and extending upward, from the bottom of the chamber 102, towards the casing exterior surface. Squeegee discs 802 can be disposed on the rod 806. Rod 806 remains within the straw when the straw is inserted into the chamber 102 and therefore enables the attached squeegee discs 802 to clean the inside of the straw. In another embodiment, the squeegee discs 802 and squeegees 804 can comprise food-grade bristles instead of food-grade discs. Rod 806 is not limited to be a cylindrical rod and can alternatively be a square rod or other geometric shape. Other embodiments do not contain a rod 806 or squeegee discs 802, and therefore rely on squeegees 804 to clean the straw.

Figure 9:
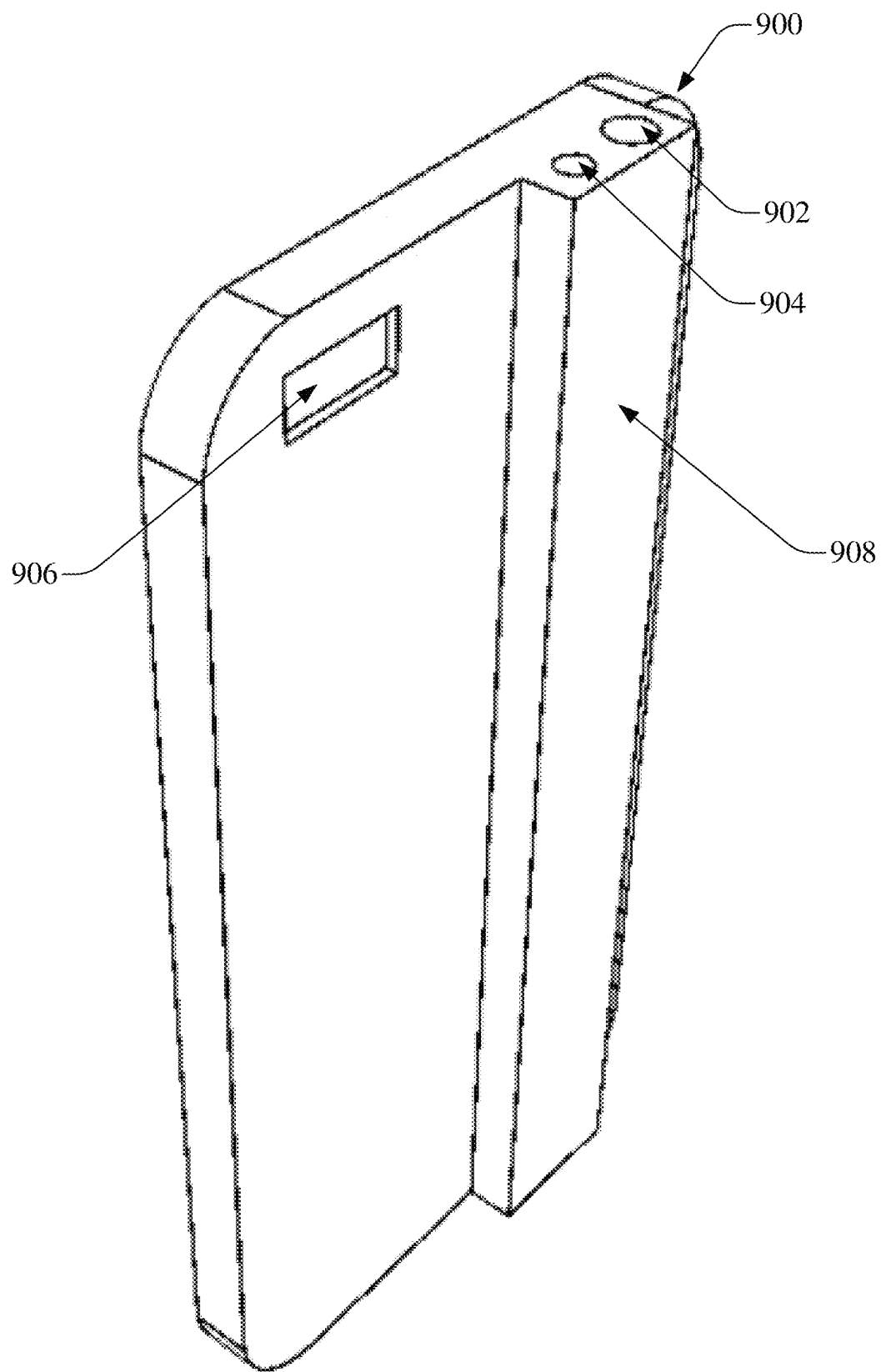
FIG. 9 is a perspective view of a mobile phone case in accordance with various aspects disclosed herein.

Referring now to FIG. 9, there is illustrated a non-limiting mobile phone case 900 in accordance with one or more embodiments described herein. The case 900 can be configured to for use with virtually any mobile device, including an Apple® iPhone®, Google Android® device, smartphone, cell phone, PDA, or calculator among others. The case 900 can be configured for each device or can be a universal-type case. The case 900 can comprise a plurality of openings 906 for maintaining inherent functionality of the mobile phone such as a camera, microphone, buttons, or other functions. The case 900 can comprise at least one of a variety of materials including, but not limited to, recycled materials, non-recycled materials, antimicrobial materials, polycarbonate, polyurethane, leather, vinyl, silicon, TPU, rubberized materials, metal, etc.

A plurality of chambers 902 can be disposed on the case 900, though FIG. 9 only depicts one chamber 902. Chamber 902 is used for storing a drinking apparatus, more particularly a straw. A straw can be removed and reinserted into the chamber 902, thus allowing for the reuse of a straw. In an embodiment, a straw is held within a chamber 902 by friction between the straw and chamber 902. Though depicted as a round opening, chamber 902 can comprise other shapes to accommodate a variety of straws. For example, a round chamber 902 can correspond to a cylindrically-shaped straw. In another example, a square or rectangular chamber 902 can correspond to a rectangularly-shaped straw. In yet another example, a rectangular chamber 902 can receive a cylindrically-shaped straw and so on.

In an embodiment, a release button 904 is depicted. The release button 904 is an optional component of case 900. A case 900 containing the release button 904 can possess a mechanical coupling, within and hidden by the exterior of the case 900, between the release button 904 and a plunger mechanism. This way, the plunger can be used, as actuated by the button 904, to push the straw out of the chamber 902 so that a user can fully remove the straw for convenient use. In other embodiments, the release button 904 can be electronically coupled to a plunger.

The chamber 902 and optional release button 902 can both be disposed in or on extension 908. Extension 908 can be disposed on a back of a case 900 as depicted in FIG. 9 or can be disposed on a different surface of the case 900. Extension 908 enables the case 900 to be small, making it easy to transport the case 900 and/or attached mobile phone within a bag or pocket.

Figure 10:
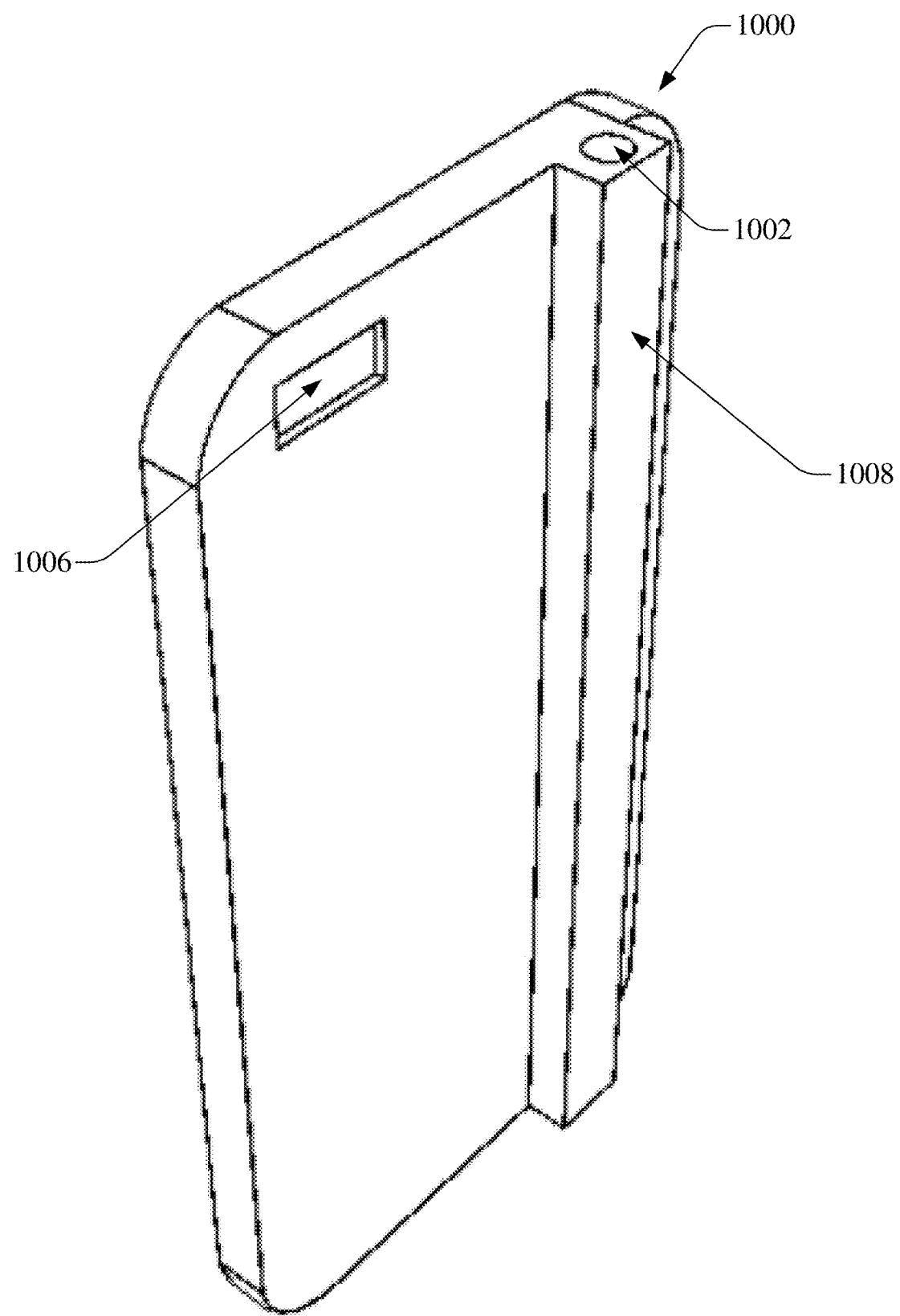
FIG. 10 is a perspective view of a mobile phone case in accordance with various aspects disclosed herein.

Referring now to FIG. 10 there is illustrated a non-limiting mobile phone case 1000 in accordance with one or more embodiments described herein. The case 1000 can be configured to for use with virtually any mobile device, including an Apple® iPhone®, Google Android® device, smartphone, cell phone, PDA, or calculator among others. The case 1000 can be configured for each device or can be a universal-type case. The case 1000 can comprise a plurality of openings 1006 for maintaining inherent functionality of the mobile phone such as a camera, microphone, buttons, or other functions. The case 1000 can comprise at least one of a variety of materials including, but not limited to, recycled materials, non-recycled materials, antimicrobial materials, food grade materials, polycarbonate, polyurethane, leather, vinyl, silicon, TPU, rubberized materials, metal, etc.

The chamber 1002 can be disposed in or on extension 1008. Extension 1008 can be disposed on a back of a case 1000 as depicted in FIG. 10 or can be disposed on a different surface of the case 1000. Extension 1008 enables the case 1000 to be small, making it easy to transport the case 1000 and/or attached mobile phone within a bag or pocket.

A plurality of chambers 1002 can be disposed on the case 1000, though FIG. 10 only depicts one chamber 1002. Chamber 1002 is used for storing a drinking apparatus, more particularly a straw. A straw can be removed and reinserted into the chamber 1002, thus allowing for the reuse of a straw. In an embodiment, a straw is held within a chamber 1002 by friction between the straw and chamber 1002. Though depicted as a round opening, chamber 1002 can comprise other shapes to accommodate a variety of straws. For example, a round chamber 1002 can correspond to a cylindrically-shaped straw. In another example, a square or rectangular chamber 1002 can correspond to a rectangularly-shaped straw. In yet another example, a rectangular chamber 1002 can receive a cylindrically-shaped straw.

A straw can be removably secured in the chamber 1002 by a click lock/click-release mechanism. In other embodiments, the straw can be removed by a user pulling the straw out of the chamber 1002. Other methods for removably securing a straw within a chamber 1002 can be implemented, such as a spring-loaded release mechanism among others.

Referring now to FIGS. 11A and 11B, there is illustrated a non-limiting mobile phone case 1100 in accordance with one or more embodiments described herein. The case 1100 can be configured to for use with virtually any mobile device and can comprise at least one of a variety of materials including, but not limited to, recycled materials, non-recycled materials, antimicrobial materials, food grade materials, polycarbonate, polyurethane, leather, vinyl, silicon, TPU, rubberized materials, metal, etc. The case 1100 can comprise a plurality of openings 1106 for maintaining inherent functionality of the mobile phone such as a camera, microphone, buttons, or other functions.

Extension 1108 can reside on a side of the case 1100. This way, no thickness is added to the case 1100 by the inclusion of a chamber 1102. Extension 1108 can reside on any side of the case 1100, such as the top, bottom, front, back, or sides as depicted in FIG. 11A and FIG. 11B.

Chamber 1102 is used for storing a drinking apparatus, more particularly a straw. A straw can be removed and reinserted into the chamber 1102, thus allowing for the reuse of a straw. In an embodiment, a straw is held within a chamber 1102 by friction between the straw and chamber 1102. Though depicted as a round opening, chamber 1102 can comprise other shapes to accommodate a variety of straws. For example, a round chamber 1102 can correspond to a cylindrically-shaped straw. In another example, a square or rectangular chamber 1102 can correspond to a rectangularly-shaped straw. In yet another example, a rectangular chamber 1102 can receive a cylindrically-shaped straw and so on.

Figure 12B:
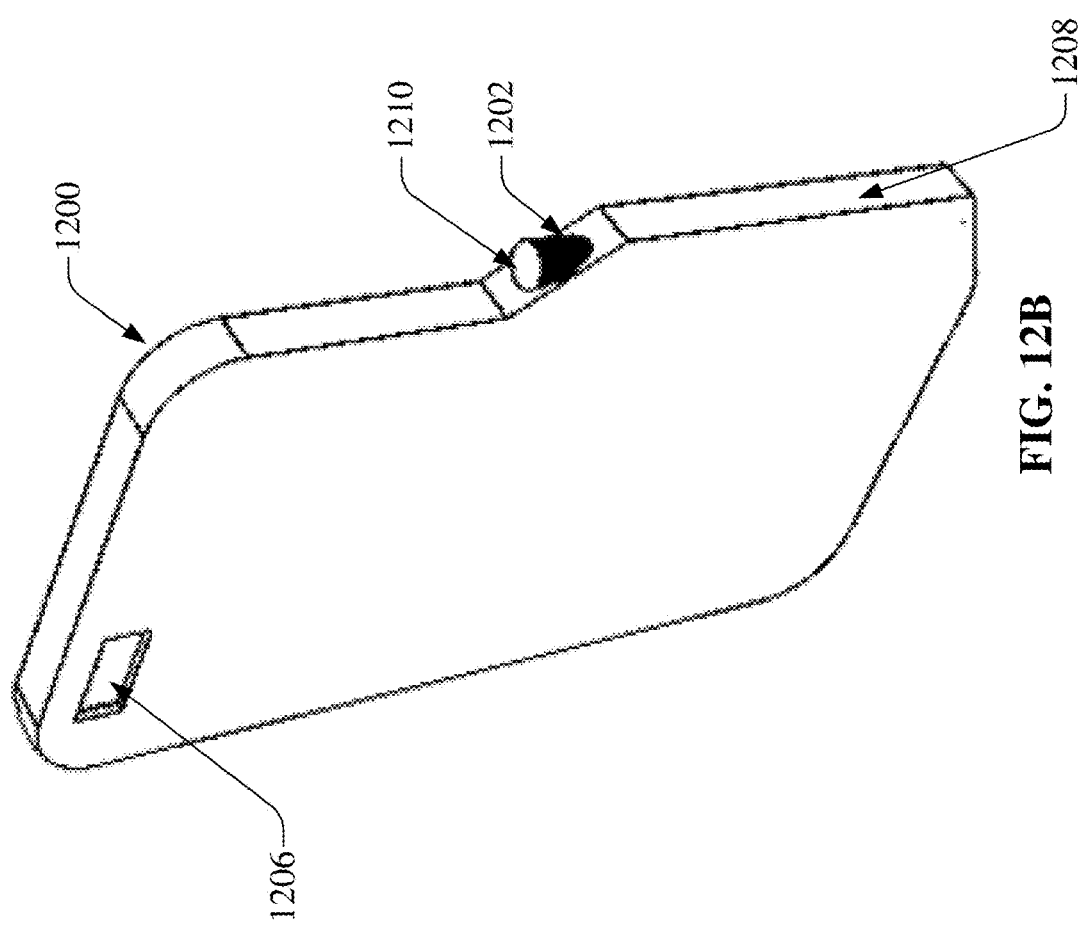
FIG. 12A and FIG. 12B are perspective views of a mobile phone case in accordance with various aspects disclosed herein.
Figure 12A:
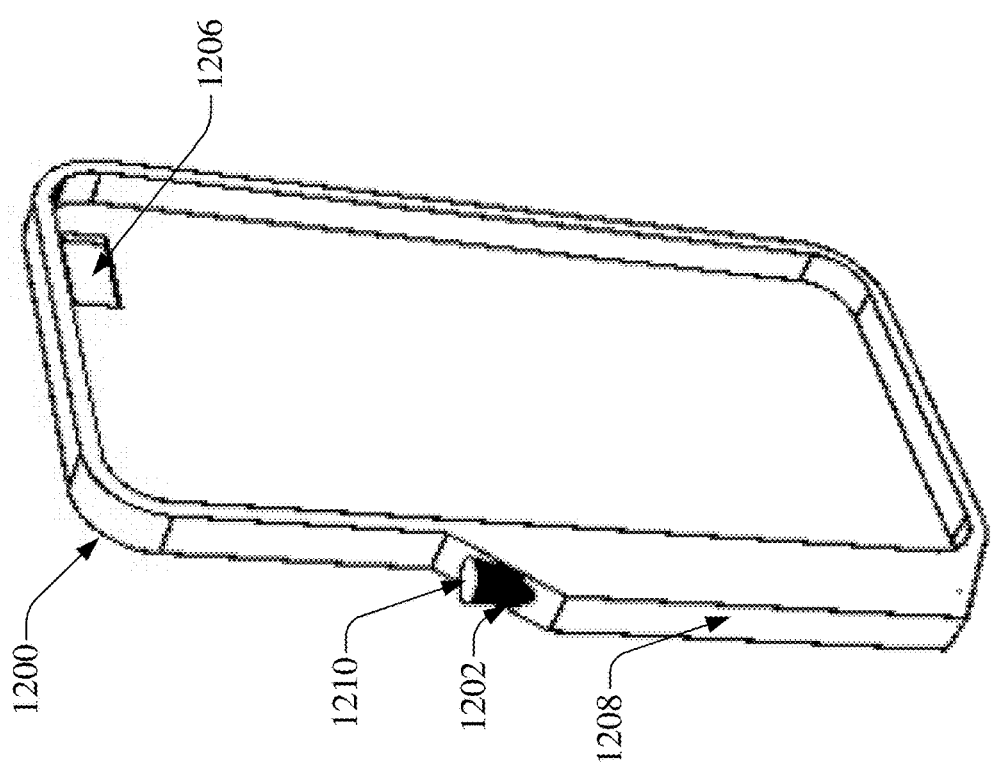

Referring now to FIGS. 12A and 12B, there is illustrated a non-limiting mobile phone case 1200 in accordance with one or more embodiments described herein. The case 1200 can be configured to for use with virtually any mobile device and can comprise at least one of a variety of materials including, but not limited to, recycled materials, non-recycled materials, antimicrobial materials, food grade materials, polycarbonate, polyurethane, leather, vinyl, silicon, TPU, rubberized materials, metal, etc. The case 1200 can comprise a plurality of openings 1206 for maintaining inherent functionality of the mobile phone such as a camera, microphone, buttons, or other functions.

Extension 1208 can reside on a side of the case 1200. This way, no thickness is added to the case 1200 by the inclusion of a chamber 1202. Extension 1208 can reside on any side of the case 1200, such as the top, bottom, front, back, or sides as depicted in FIG. 12A and FIG. 12B. A top-side of extension 1208 can be angular as depicted in FIG. 12A and FIG. 12B. In this regard, the straw 1210 can be protected and removal can be easily facilitated. A bottom-side of extension 1208 can be angled or curved to blend with the shape of the case 1200, making the case 1200 still fit easily in pants pockets. Other variations of shape and curvature of the extension 1208 can be implemented.

Chamber 1202 is used for storing a drinking apparatus, more particularly a straw 1210. A straw 1210 can be removed and reinserted into the chamber 1202, thus allowing for the reuse of the straw 1210. In an embodiment, a straw 1210 is held within a chamber 1202 by friction between the straw 1210 and chamber 1202. Though depicted as a round opening, chamber 1202 can comprise other shapes to accommodate a variety of straws 1210. For example, a round chamber 1202 can correspond to a cylindrically-shaped straw 1210. In another example, a square or rectangular chamber 1202 can correspond to a rectangularly-shaped straw 1210. In yet another example, a rectangular chamber 1202 can receive a cylindrically-shaped straw and so on.

A straw 1210 can be removably secured in the chamber 1202 by a click lock/click-release mechanism. In other embodiments, the straw 1210 can be removed by a user pulling the straw 1210 out of the chamber 1202 or other release mechanisms.

Figure 13:
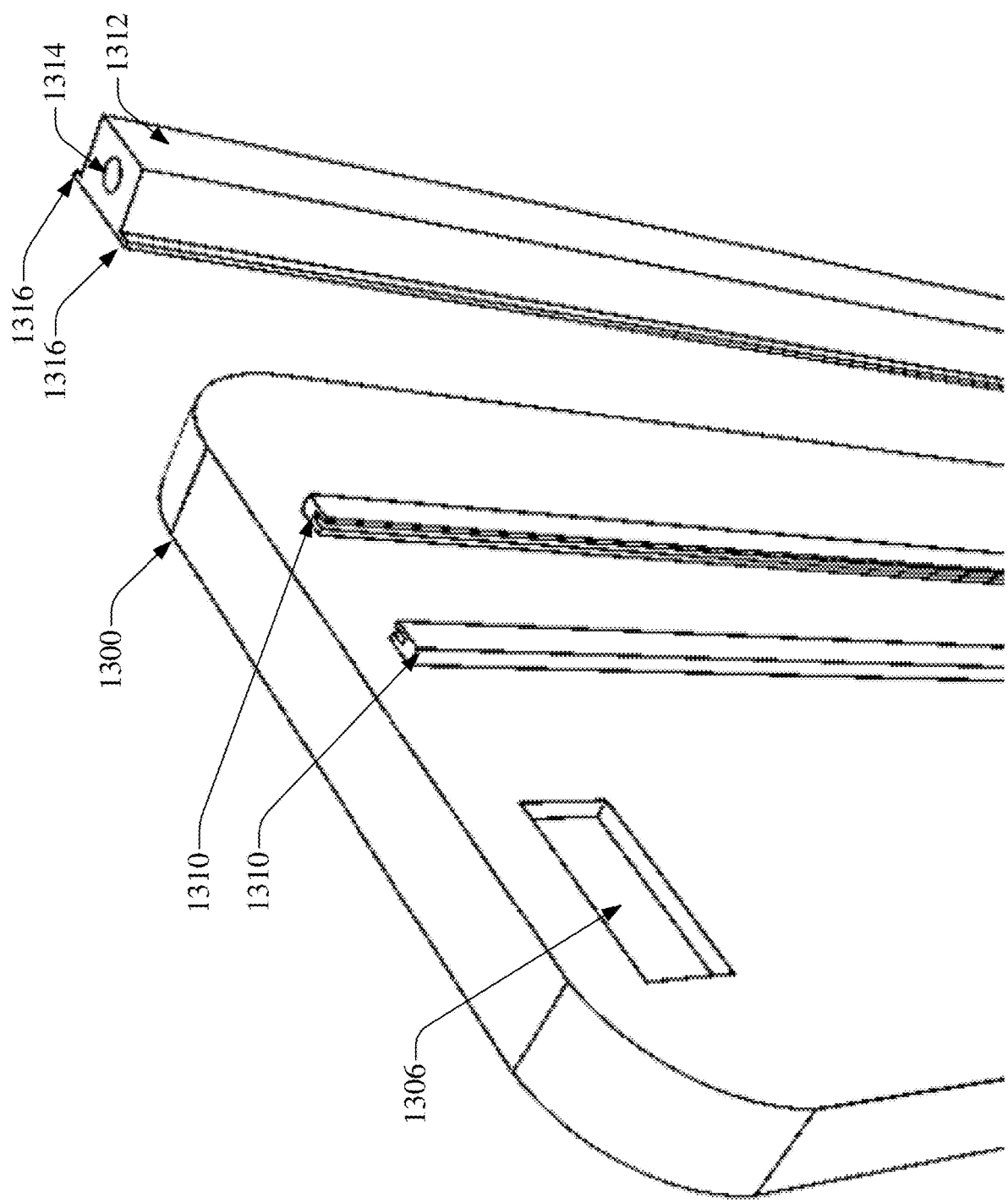
FIG. 13 is a perspective view of a mobile phone case in accordance with various aspects disclosed herein.

Referring now to FIG. 13, there is illustrated a non-limiting mobile phone case 1300 in accordance with one or more embodiments described herein. The case 1300 can be configured to for use with virtually any mobile device and can comprise at least one of a variety of materials including, but not limited to, recycled materials, non-recycled materials, antimicrobial materials, food grade materials, polycarbonate, polyurethane, leather, vinyl, silicon, TPU, rubberized materials, metal, etc. The case 1300 can comprise a plurality of openings 1306 for maintaining inherent functionality of the mobile phone such as a camera, microphone, buttons, or other functions.

Case 1300 can comprise attachment mechanisms 1310 for coupling with corresponding attachment mechanisms 1316 on a detachable holder 1312. This way, detachable holder 1312 can be removed and reattached to the case 1300, allowing for use of the case 1300 and mobile phone contained therein with or without the detachable holder 1312 and straw contained therein. Removing the detachable holder 1312 can reduce added bulk with respect to the case 1300 when a straw isn't needed. Alternatively, the detachable holder 1312 can be reattached for activities when a straw may be needed, such as going out to lunch.

Attachment mechanisms 1310 can comprise channels or slots as depicted in FIG. 13. Attachment mechanisms 1310 can alternatively comprise other attachment types or methods such as snap locking apparatuses and other types or methods of removable attachment or adhesion as would be evident to one skilled in the art. Attachment mechanisms 1310 can reside on any side of the case 1300, such as the top, bottom, sides, front, or back as depicted in FIG. 13. The case 1300 can possess a plurality of attachment mechanisms 1310, enabling a user can choose where to secure a detachable holder 1312 or secure a plurality of detachable holders 1312.

Detachable holder 1312 is used for storing a drinking apparatus, more particularly a straw. A straw can be removed and reinserted into the chamber 1314, thus allowing for the reuse of the straw. In an embodiment, a straw is held within a chamber 1314 by friction between the straw and chamber 1314. Though depicted as a round opening, chamber 1314 can comprise other shapes to accommodate a variety of straws. For example, a round chamber 1314 can correspond to a cylindrically-shaped straw. In another example, a square or rectangular chamber 1314 can correspond to a rectangularly-shaped straw. In yet another example, a rectangular chamber 1314 can receive a cylindrically-shaped straw and so on.

Attachment mechanisms 1316 can comprise fins as depicted in FIG. 13. Attachment mechanisms 1316 can alternatively comprise other attachment types or methods such as snap locking apparatuses and other types or methods of removable attachment or adhesion as would be evident to one skilled in the art and can reside on any side of the case detachable holder 1312.

Figure 14:
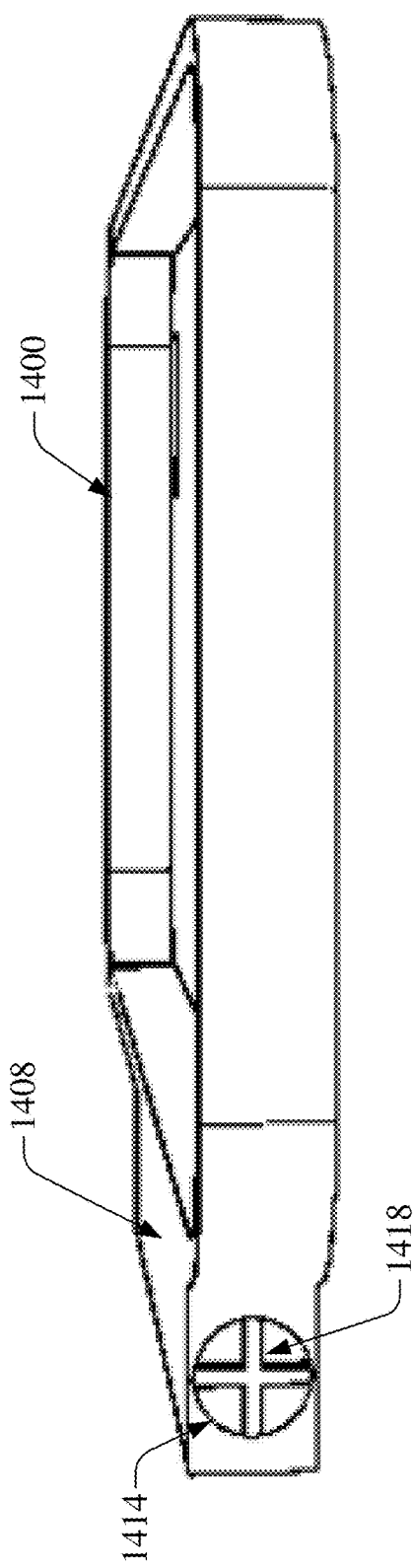
FIG. 14 is a perspective view of a mobile phone case in accordance with various aspects disclosed herein.

Referring now to FIG. 14, there is illustrated a non-limiting mobile phone case 1400 in accordance with one or more embodiments described herein. The case 1400 can be configured to for use with virtually any mobile device and can comprise at least one of a variety of materials including, but not limited to, recycled materials, non-recycled materials, antimicrobial materials, food grade materials, polycarbonate, polyurethane, leather, vinyl, silicon, TPU, rubberized materials, metal, etc.

The case 1400 can comprise an extension 1408 on a side of the case 1400 or on a back of the case 1400 like in previous embodiments. Chamber 1414 is used for storing a drinking apparatus, more particularly a straw. A straw can be removed and reinserted into the chamber 1414, thus allowing for the reuse of the straw. In an embodiment, a straw is held within a chamber 1414 by friction between the straw and chamber 1414. Though depicted as a round opening, chamber 1414 can comprise other shapes to accommodate a variety of straws. For example, a round chamber 1414 can correspond to a cylindrically-shaped straw. In another example, a square or rectangular chamber 1414 can correspond to a rectangularly-shaped straw 1414. In yet another example, a rectangular chamber 1414 can receive a cylindrically-shaped straw and so on.

Chamber 1414 can comprise a vent 1418 disposed on a side of chamber 1414. The vent 1418 can be located on a bottom of the chamber 1414, as depicted in FIG. 14, or on a different side. Preferably, the vent 1418 vents to the atmosphere exterior to the case 1400, though it is not required to and can alternatively vent into an interior of the case 1400. The vent 1414 can provide fresh, ambient air to the chamber 1414, thus facilitating quicker drying and reducing bacteria or mold growth. The vent 1418 can also make cleaning the chamber 1414 easier by allowing cleaning products or water to flow out of the chamber 1414. In an embodiment, the vent 1418 can be retractably slidable, thus adding the ability to push a straw out of a chamber 1414 while still providing ventilation.

Figure 15:
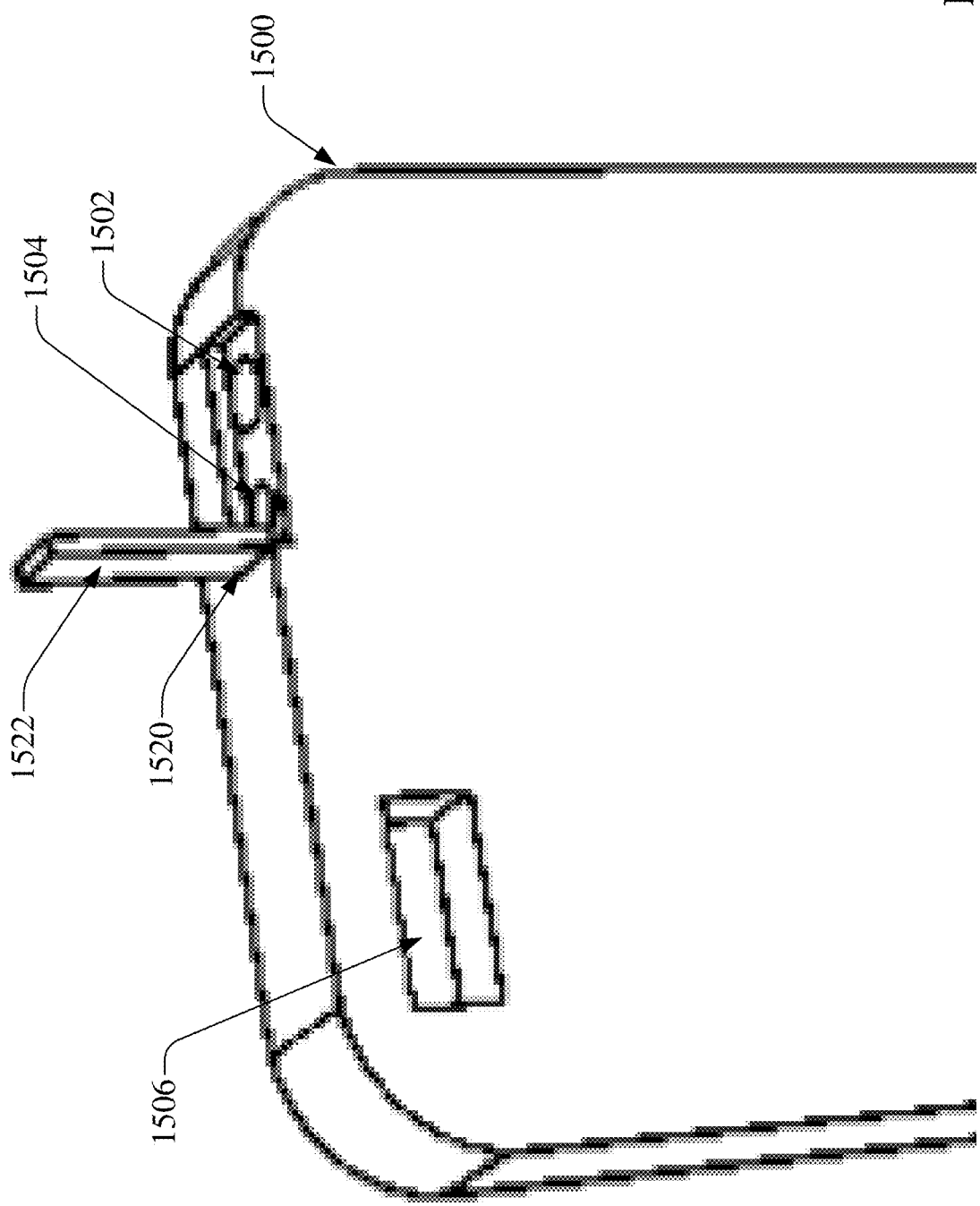
FIG. 15 is a perspective view of a mobile phone case in accordance with various aspects disclosed herein.

Referring now to FIG. 15, there is illustrated a non-limiting mobile phone case 1500 in accordance with one or more embodiments described herein. The case 1500 can be configured to for use with virtually any mobile device and can comprise at least one of a variety of materials including, but not limited to, recycled materials, non-recycled materials, antimicrobial materials, food grade materials, polycarbonate, polyurethane, leather, vinyl, silicon, TPU, rubberized materials, metal, etc. The case 1500 can comprise a plurality of openings 1506 for maintaining inherent functionality of the mobile phone such as a camera, microphone, buttons, or other functions.

A cap 1522 is secured to the case 1500 by a living hinge 1520. The cap 1522 can be held closed by a snap locking mechanism or other securing method as would be evident to one skilled in the art.

Chamber 1502 is used for storing a drinking apparatus, more particularly a straw. A straw can be removed and reinserted into the chamber 1502, thus allowing for the reuse of a straw. Though depicted as a round opening, chamber 1502 can comprise other shapes to accommodate a variety of straws. For example, a round chamber 1502 can correspond to a cylindrically-shaped straw. In another example, a square or rectangular chamber 1502 can correspond to a rectangularly-shaped straw. In yet another example, a rectangular chamber 1502 can receive a cylindrically-shaped straw and so on.

In an embodiment, the chamber 1502 contains a spring for pushing a straw out of the chamber 1502. The straw can be removably secured in the chamber 1502 by the cap 1522. The spring in the chamber 1502 is not strong enough to overcome the closure of the cap 1522 without user intervention. This way, the spring propels the straw partially out of the chamber 1502 when the cap 1522 is opened. Additionally, a user can close the cap 1522 over the straw, thus pushing the straw fully into the chamber 1502 and securing storing the straw within the chamber 1502, ready to be again released by a user opening the cap 1522.

In another embodiment, the case 1500 can have disposed thereon a component 1504. Component 1504 can comprise a button that can be located underneath the cap 1522, such that closure of the cap 1522 can engage the component 1504. Engagement of the component 1504 can be configured to perform at least one of a variety of functions, such as locking/unlocking the straw the chamber 1502 or sending a signal to a processor indicative of the open or closed status of the cap 1522. In the case of sending a signal, a UV light can be controlled depending on the open/closed status of the cap 1522. In another embodiment, component 1504 could instead comprise an ambient light sensor or other type of sensor.

In yet another embodiment, the component 1504 can comprise a light, indicative of a status of the case 1500. Such a status can comprise the charge level of the case 1500 or the presence of a straw contained within the chamber 1502.

The case 1500 can be configurable such that the component 1504 can be interchangeable with respective variations of the component 1504, either as indicated herein or with other variations.

Figure 16:
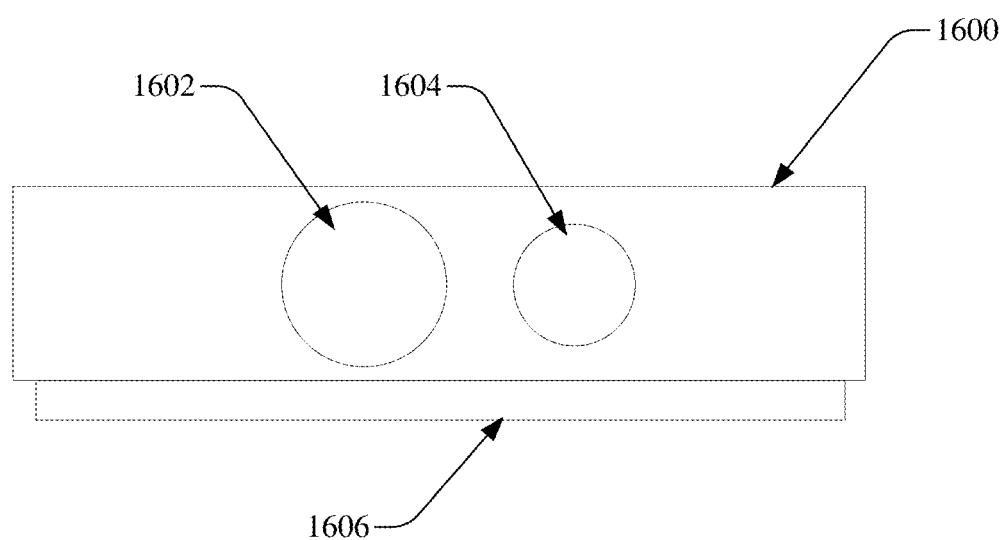
FIG. 16 is a perspective view of a case in accordance with various aspects disclosed herein.
Figure 17:
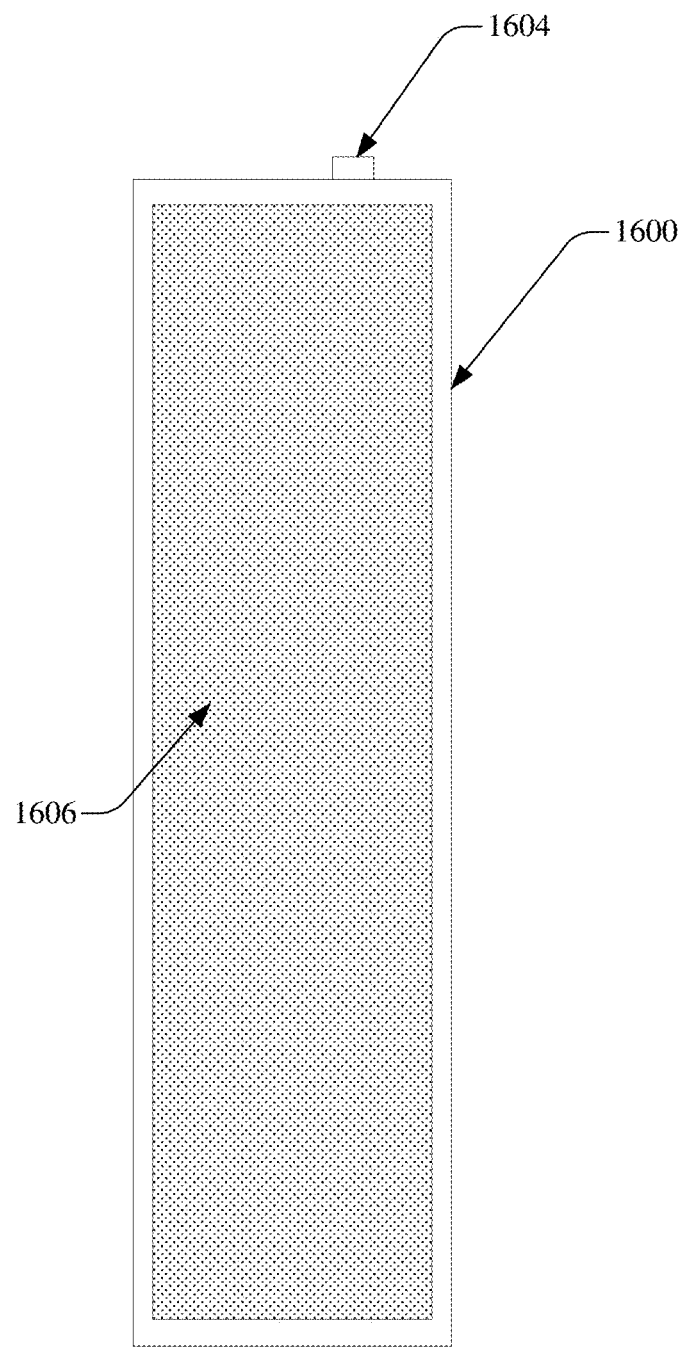
FIG. 17 is a perspective view of a case in accordance with various aspects disclosed herein.
Figure 18:
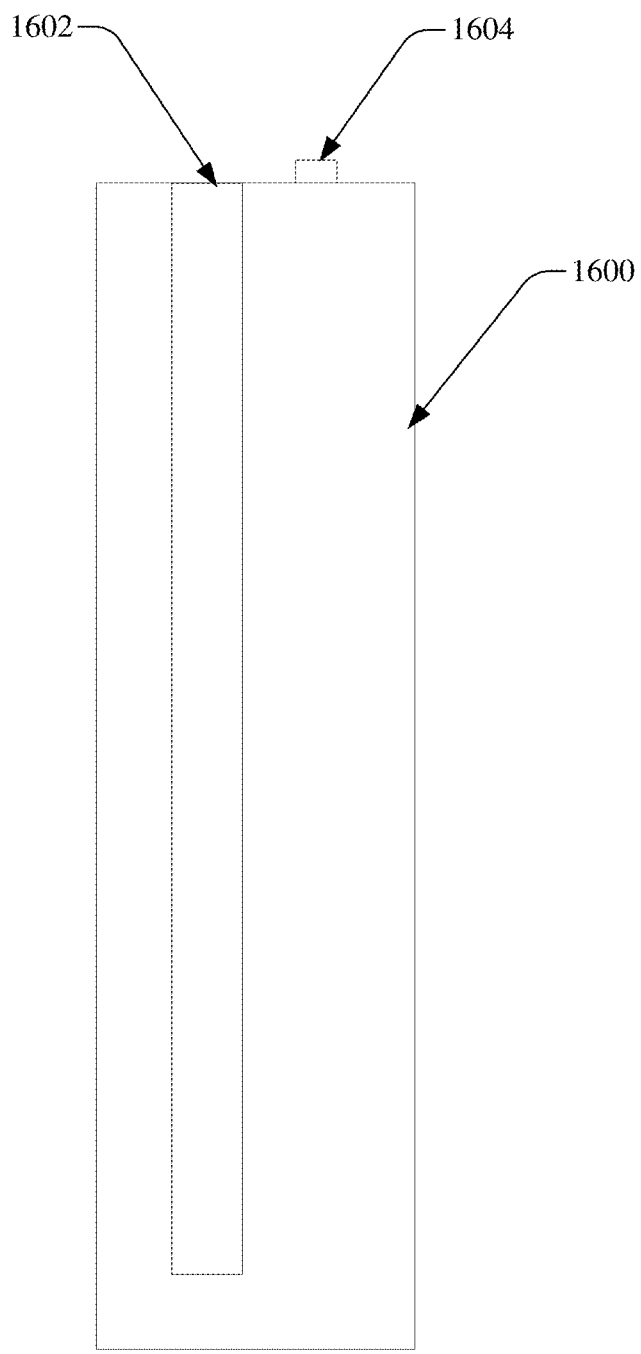
FIG. 18 is a section view of a case in accordance with various aspects disclosed herein.

Referring now to FIG. 16 and FIG. 17 there is illustrated a non-limiting case 1600 in accordance with one or more embodiments described herein. A cross-section of the case 1600 is depicted in FIG. 18. The case 1600 can comprise at least one of a variety of materials including, but not limited to, recycled materials, non-recycled materials, antimicrobial materials, food grade materials, polycarbonate, polyurethane, leather, vinyl, silicon, TPU, rubberized materials, metal, etc.

Adhesive 1606 can be disposed on a side of the case 1600. In this regard, the adhesive 1606 can comprise an adhesive layer. The adhesive 1606 can be received on an entire side of the case 1600 or can be partially received on a side of the case 1600. Other embodiments may not utilize an adhesive 1606. Adhesive 1606 can be employed to adhere case 1600 to virtually any object, making the case 1600 highly universal and adaptable to a user's needs. An advantage of a case 1600 possessing an adhesive 1606 is the ability to adhere to a mobile device including an Apple® iPhone®, Google Android® device, smartphone, cell phone, PDA, or calculator among others without the need to adapt the case 1600 for individual mobile devices.

Adhesive 1606 can comprise at least one of a plurality of adhesive types. For example, adhesive 1606 can comprise, but is not limited to, permanent adhesives, non-permanent adhesives, semi-permanent adhesives, removable adhesives, replaceable adhesives, adhesive coatings, pressure sensitive adhesives, acrylic adhesives, epoxy resins, rubber-based adhesives, silicone adhesives, polyurethane adhesives, isocyanate adhesives, cyanoacrylate adhesives, wax adhesives, glue, gel adhesives, adhesive pads, tape, pressure sensitive tape, water activated tape, heat sensitive tape, hook and loop fasteners, static cling material, magnets, suction/suction cup, microsuction tape, synthetic setae, putty, mechanical coupling, etc.

In an embodiment, the adhesive 1606 can be replaceable such that a user can replace the adhesive 1606 if it wears out. In another embodiment, the adhesive 1606 is permanently affixed to the case 1600. In yet another embodiment, adhesive 1606 can be covered or protected by a removable film, whereby removal of the removable film reveals the adhesive 1606. While the removable film is affixed to the adhesive 1606, the removable film can protect the adhesive 1606 and thus prevent degradation of the adhesive properties of adhesive 1606.

Chamber 1602 is used for storing a drinking apparatus, more particularly a straw. A straw can be removed and reinserted into the chamber 1602, thus allowing for the reuse of the straw. In an embodiment, a straw is held within a chamber 1602 by friction between the straw and chamber 1602. Though depicted as a round opening, chamber 1602 can comprise other shapes to accommodate a variety of straws. For example, a round chamber 1602 can correspond to a cylindrically-shaped straw. In another example, a square or rectangular chamber 1602 can correspond to a rectangularly-shaped straw. In yet another example, a rectangular chamber 1602 can receive a cylindrically-shaped straw and so on.

Chamber 1602 can possess a vent disposed on a side of chamber 1602. Preferably, the vent enables ventilation to an exterior of the case 1600, though it is not required to and can alternatively vent into an interior of the case 1600. The vent can provide fresh, ambient air to the chamber 1602, thus facilitating quicker drying and reducing bacteria or mold growth. The vent can also make cleaning the chamber 1602 easier by allowing cleaning products or water to flow out of the chamber 1602. In an embodiment, the vent can be retractably slidable, thus adding the ability to push a straw out of a chamber 1602 while still providing ventilation.

The release button 1604 is an optional component of case 1600. Similar to previous embodiments utilizing button(s), button 1604 can be mechanically coupled, within and hidden by the exterior of the case, to a plunger mechanism inside of the chamber 1602. The button 1604 can be coupled to a rod which can depress a plunger. The plunger can be cantilevered about a hinge. This way, the plunger can be used as actuated by the button 1604, to push the straw out of the chamber 1602 so that a user can fully remove the straw for convenient use.

In other embodiments, the release button 1604 can be electronically coupled to a plunger. This way, though there is no mechanical linkage between the release button 1604 and the plunger, actuation of the release button 1604 can send a signal to the plunger. The case 1600 can comprise a motor to then engage the plunger to push the straw out of the chamber 1602.

In another embodiment, similar to previous embodiments, a spring can be disposed within the chamber 1602 and a cap can be disposed over the opening of the chamber 1602. The cap can include a living hinge and utilize at least one of a variety of attachment means, such as a snap-lock. The closure of cap can retain a straw within the case 1600, and the spring can ensure that the straw is propelled out of the case when the cap is opened. Other straw-securing mechanisms including, but not limited to, click lock/click-release mechanisms as previously described in other embodiments can be implemented into the case 1600 to ease insertion and removal of a straw into and out of a chamber 1602.

A UV sterilization light, similar to those of previously described embodiments, can be disposed within the chamber 1602 or case 1600. The UV sterilization light can be activated by a button (e.g. button 1604), sensor, or at least one of other activations mechanisms. The UV light can be powered by a battery internal to the case 1600. The battery can also supply power for other functions of the case 1600. A controller can control the operations of the UV light and other functions.

The case 1600 can comprise at least one of a plurality of straw-cleaning mechanisms. For example, similar to mechanisms as previously described in other embodiments, the chamber 1602 can contain food-grade silicon squeegee discs and squeegees for cleaning the straw when it is inserted into the chamber 1602. The squeegee discs and squeegees can comprise other suitable materials safe for cleaning a straw. Squeegees can be disposed in the interior wall of the chamber 1602. This way, squeegees can clean the exterior of the straw. A rod can be disposed concentric to the chamber 1602, and extending upward, from the bottom of the chamber 1602, towards the casing exterior surface. Squeegee discs can be disposed on the rod. The rod remains within the straw when the straw is inserted and allow for attached squeegee discs to clean of the inside of the straw. In another embodiment, the squeegee discs and squeegees can comprise food-grade bristles instead of food-grade discs. The rod is not limited to be a cylindrical rod and can alternatively be a square rod or other geometric shape. Other embodiments do not contain a rod and squeegee discs and therefore rely on squeegees to clean the straw.

Figure 19:
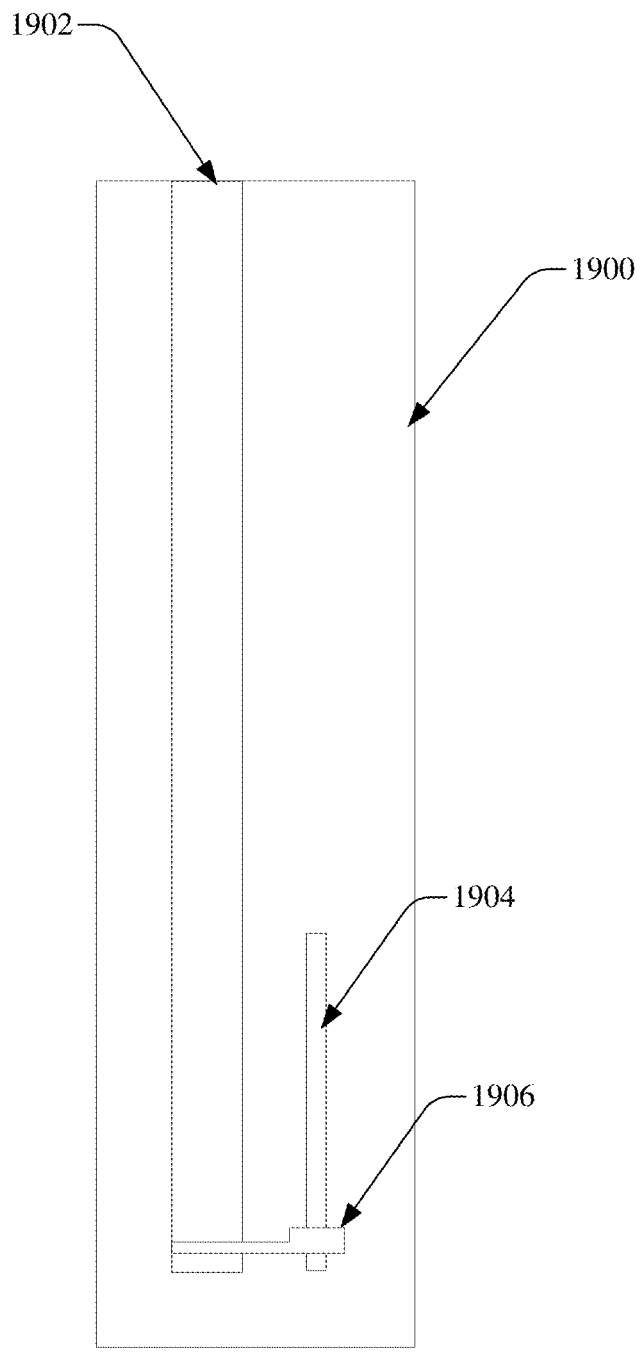
FIG. 19 is a section view of a case in accordance with various aspects disclosed herein.

Referring now to FIG. 19 a cross section of a case 1900 is depicted. A slot 1904 can be received through a surface of the case 1900. The slot 1904 can be parallel to the chamber 1902. A slider 1906 can be slidably coupled to case 1900 through the slot 1904. The slider 1906 can have an exposed portion protruding through an exterior of the case 1900 and an interior portion received within the chamber 1902. Thus, a user can move the slider 1906 by sliding the exposed portion of the slider 1906 whereby the interior portion of the slider 1906 can correspondingly move. Thus, in the case of a straw being removably received within the chamber 1902, sliding the slider 1906 (e.g. upward) can push the straw out of the chamber 1902. The slider 1906 can be movably restrained within the slot 1904 by friction between the slider 1906 and slot 1904 of the case 1900 or other components. In other embodiments, the slider 1906 can be movably retrained within the slot 1904 by spring(s) or other mechanisms or methods.

Figure 20:
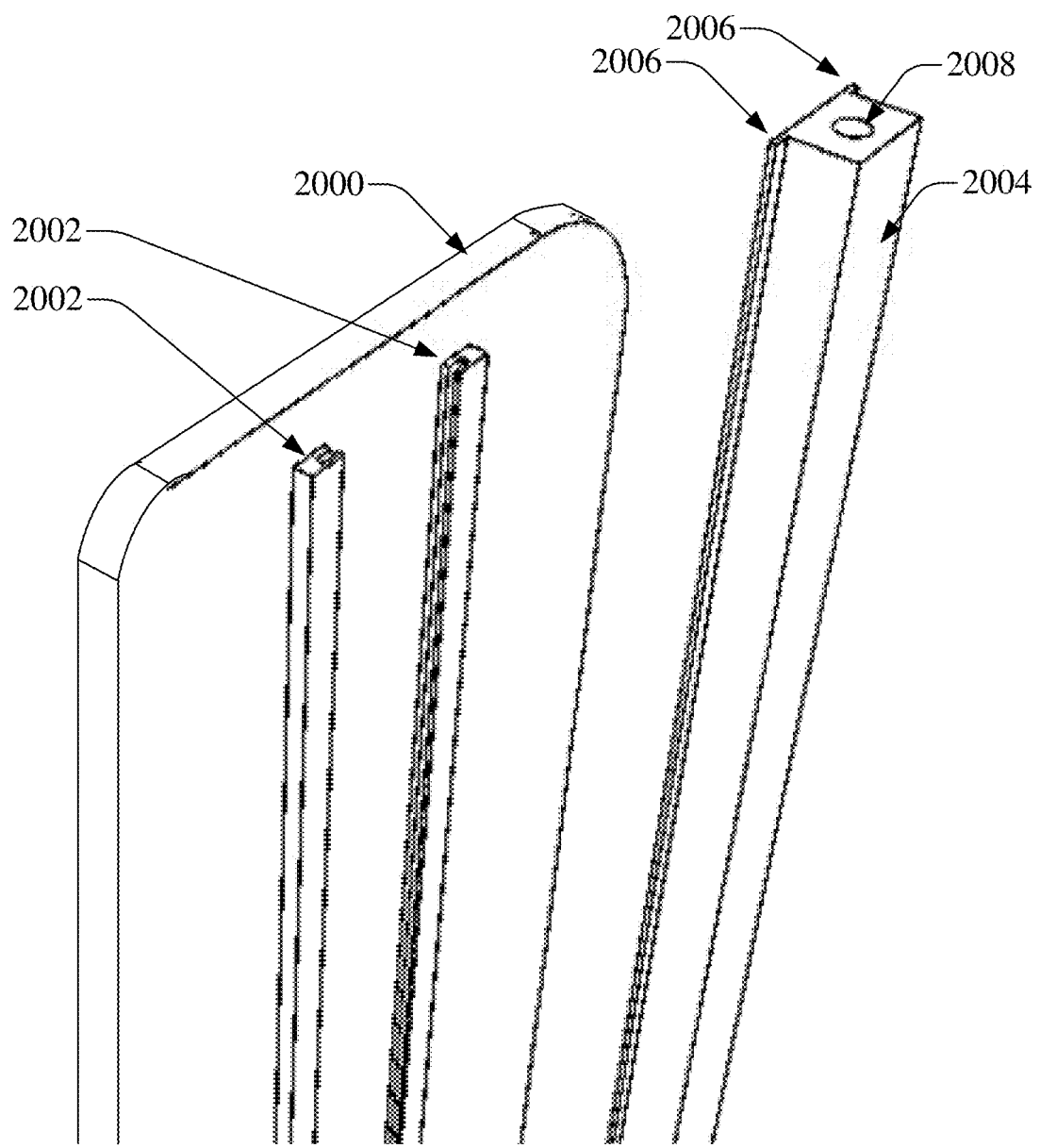
FIG. 20 is a perspective view of a case in accordance with various aspects disclosed herein.

Referring now to FIG. 20, there is illustrated a non-limiting base 2000 in accordance with one or more embodiments described herein. The base 2000 can comprise at least one of a variety of materials including, but not limited to, recycled materials, non-recycled materials, antimicrobial materials, food grade materials, polycarbonate, polyurethane, leather, vinyl, silicon, TPU, rubberized materials, metal, etc.

The base 2000 can be configured to for use with virtually any mobile device and can comprise at least one of a variety of materials including, but not limited to, recycled materials, non-recycled materials, antimicrobial materials, food grade materials, polycarbonate, polyurethane, leather, vinyl, silicon, TPU, rubberized materials, metal, etc.

Base 2000 can comprise attachment mechanisms 2002 for coupling with corresponding attachment mechanisms 2006 on a detachable holder 2004. This way, detachable holder 2004 can be removed and reattached to the base 2000, allowing for use of the base 2000 with or without the detachable holder 2004 and straw contained therein. Removing the detachable holder 2004 can reduce added bulk from the base 2000 when a straw isn't needed. Alternatively, the detachable holder 2004 can be reattached for activities when a straw may be needed, such as going out to lunch.

Attachment mechanisms 2002 can comprise channels or slots as depicted in FIG. 20. Attachment mechanisms 2002 can alternatively comprise other attachment types or methods such as snap locking apparatuses or other types or methods of removable attachment or adhesion as would be evident to one skilled in the art. Attachment mechanisms 2002 can reside on any side of the base 2000, such as the top, bottom, sides, front, or back as depicted in FIG. 20. The base 2000 can possess a plurality of attachment mechanisms 2002, enabling a user can choose where to secure a detachable holder 2004 or secure a plurality of detachable holders 2004.

Detachable holder 2004 is used for storing a drinking apparatus, more particularly a straw. A straw can be removed and reinserted into the chamber 2008, thus allowing for the reuse of the straw. In an embodiment, a straw is held within a chamber 2008 by friction between the straw and chamber 2008. Though depicted as a round opening, chamber 2008 can comprise other shapes to accommodate a variety of straws. For example, a round chamber 2008 can correspond to a cylindrically-shaped straw. In another example, a square or rectangular chamber 2008 can correspond to a rectangularly-shaped straw. In yet another example, a rectangular chamber 2008 can receive a cylindrically-shaped straw and so on.

Attachment mechanisms 2006 can comprise fins as depicted in FIG. 20. Attachment mechanisms 2006 can alternatively comprise other attachment types or methods such as snap locking apparatuses or other types or methods of removable attachment or adhesion as would be evident to one skilled in the art and can reside on any side of the case detachable holder 2004.

Figure 21:
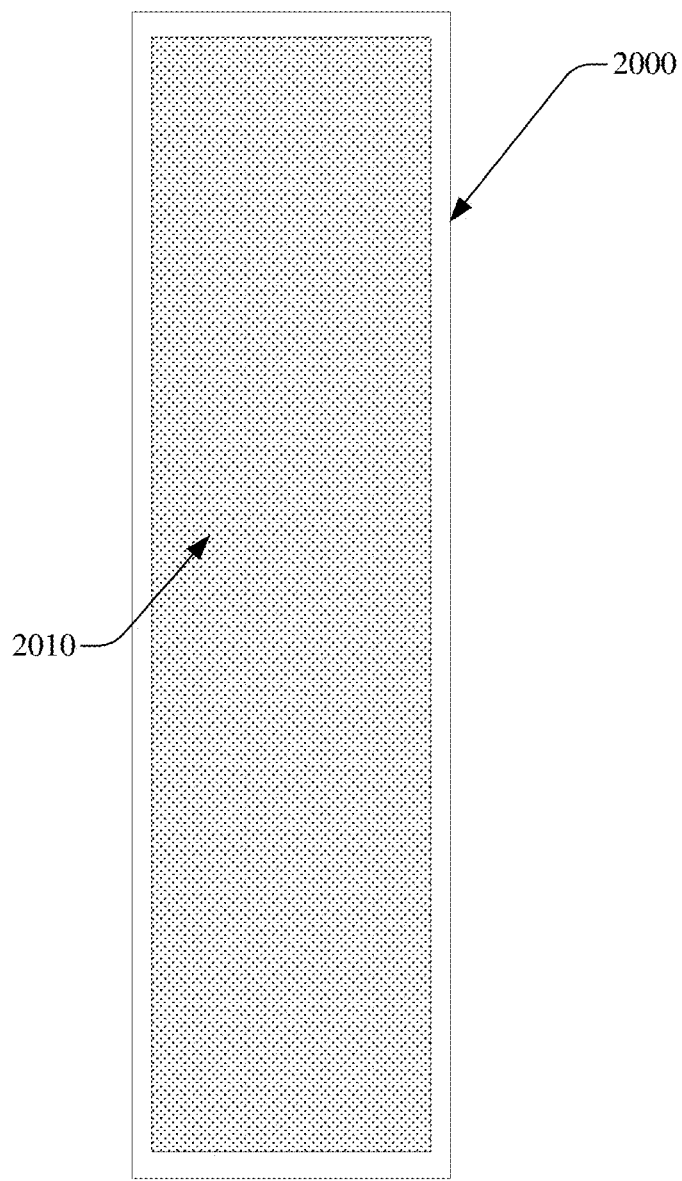
FIG. 21 is a perspective view of a case in accordance with various aspects disclosed herein.

FIG. 21 depicts a view of a side of the base 2000. Adhesive 2010 can be disposed on a side of the base 2000. The adhesive 2010 can be received on an entire side of the base 2000 or can be partially received on a side of the base 2000. Other embodiments may not utilize an adhesive 2010. Adhesive 2010 can be employed to adhere base 2000 to virtually any object, making the base 2000 highly universal and adaptable to a user's needs. An advantage of a base 2000 possessing an adhesive 2010 is the ability to adhere to a mobile device including an Apple® iPhone®, Google Android® device, smartphone, cell phone, PDA, or calculator among others without the need to adapt the base 2000 for different mobile devices.

Adhesive 2010 can comprise at least one of a plurality of adhesive types. For example, adhesive 2010 can comprise, but is not limited to, permanent adhesives, non-permanent adhesives, semi-permanent adhesives, removable adhesives, replaceable adhesives, adhesive coatings, pressure sensitive adhesives, acrylic adhesives, epoxy resins, rubber-based adhesives, silicone adhesives, polyurethane adhesives, isocyanate adhesives, cyanoacrylate adhesives, wax adhesives, glue, gel adhesives, adhesive pads, tape, pressure sensitive tape, water activated tape, heat sensitive tape, hook and loop fasteners, static cling material, magnets, suction/suction cup, microsuction tape, synthetic setae, putty, mechanical coupling, etc.

In an embodiment, the adhesive 2010 can be replaceable such that a user can replace the adhesive 2010 if it wears out. In another embodiment, the adhesive 2010 is permanently affixed to the base 2000. In yet another embodiment, adhesive 2010 can be covered or protected by a removable film, whereby removal of the removable film reveals the adhesive 2010. While the removable film is affixed to the adhesive 2010, the removable film can protect the adhesive 2010 and thus prevent degradation of the adhesive properties of adhesive 2010.

Figure 22:
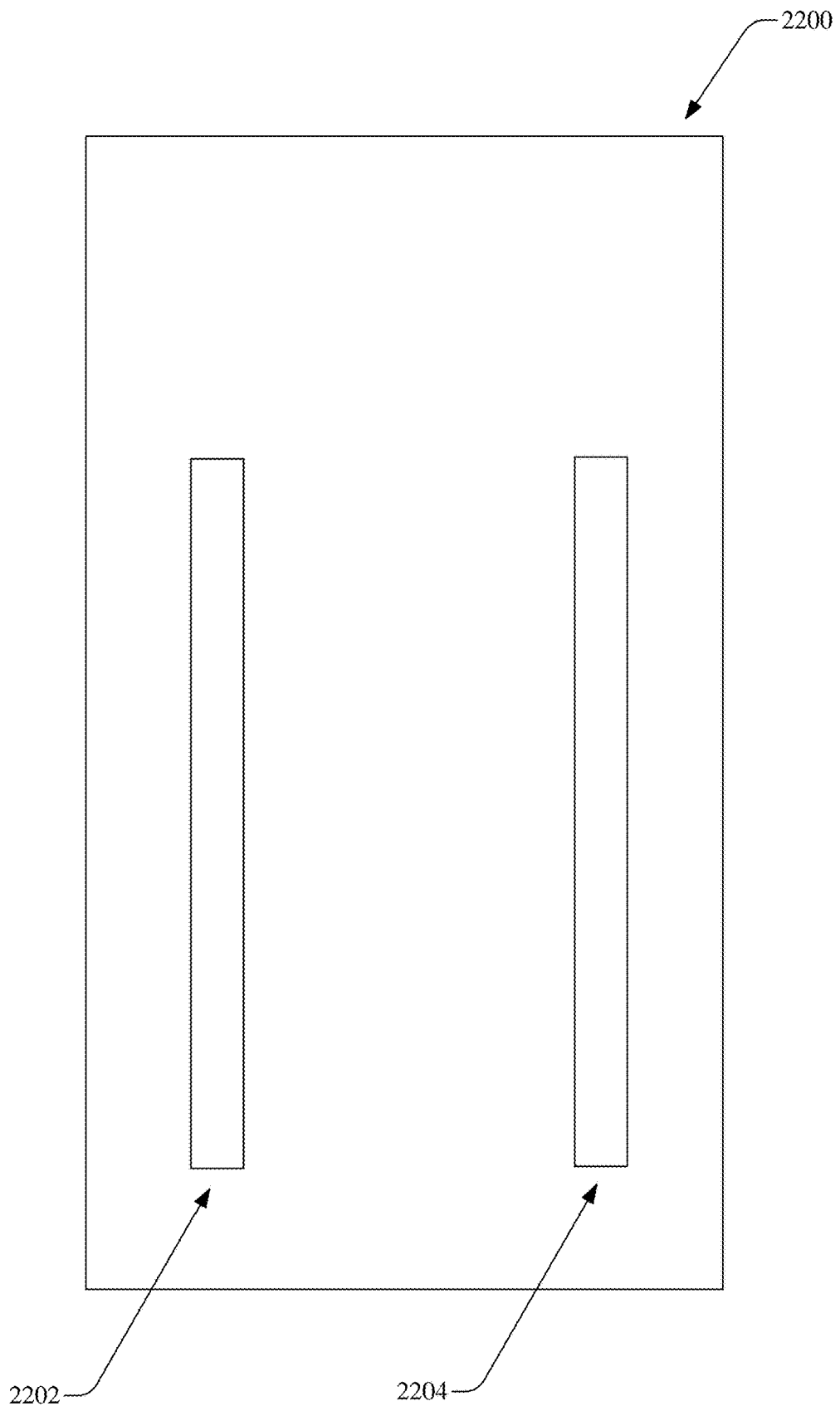
FIG. 22 is a perspective view of a case in accordance with various aspects disclosed herein.
Figure 23:
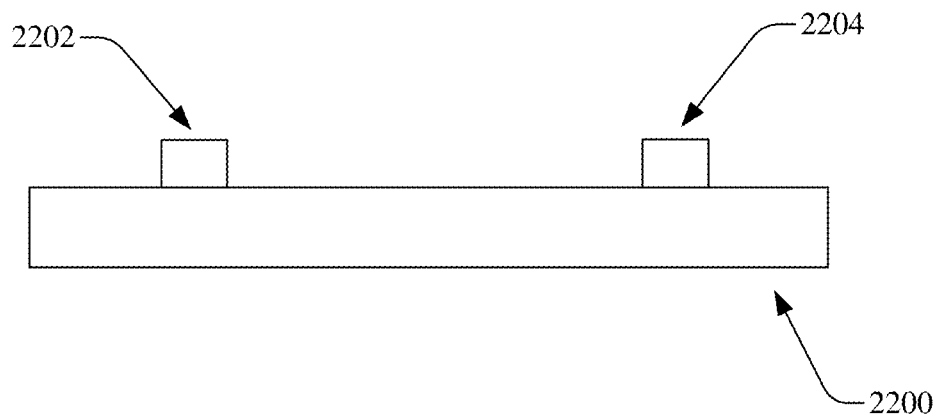
FIG. 23 is a perspective view of a case in accordance with various aspects disclosed herein.

Turning now to FIGS. 22 and 23, there is illustrated a non-limiting mobile phone case 2200 in accordance with one or more embodiments described herein. The case 2200 can be configured to for use with virtually any mobile device, including an Apple® iPhone®, Google Android® device, smartphone, cell phone, PDA, or calculator among others. The case 2200 can be configured for each device or can be a universal-type case.

The case 2200 can comprise at least one of a variety of materials including, but not limited to, recycled materials, non-recycled materials, antimicrobial materials, food grade materials, polycarbonate, polyurethane, leather, vinyl, silicon, TPU, rubberized materials, metal, etc.

The case 2200 can comprise a rail 2202 and/or a rail 2204 (i.e. slider rails). Rails 2202 or 2204 can be straight, as depicted in FIG. 22 or can possess curvature. Rail 2202 and rail 2204 are depicted as the same shape and size as one another but can alternatively be different shapes or sizes from each other. Further, rails 2202 and 2204 can extend fully to an end of the case 2200 or can be located within a perimeter of a surface of the case 2200, as shown in FIG. 22.

Rails 2202 or 2204 can comprise dove-tail slider rails. The rails 2202 or 2204 can be adherable to the case 2200. Indeed, the rails 2202 or 2204 can be adherable virtually any surface capable of receiving the rail 2202 or 2204. For instance, a receiving surface having dimensions sufficient for adhesion with a rail 2202 or a rail 2204 can receive the rail 2202 or 2204.

According to an example, rail 2202 or 2204 can be adherable to a mobile phone case 2200 or to a mobile device, such as a smartphone. Adhesives can include, but are not limited to, permanent adhesives, non-permanent adhesives, semi-permanent adhesives, removable adhesives, replaceable adhesives, adhesive coatings, pressure sensitive adhesives, acrylic adhesives, epoxy resins, rubber-based adhesives, silicone adhesives, polyurethane adhesives, isocyanate adhesives, cyanoacrylate adhesives, wax adhesives, glue, gel adhesives, adhesive pads, tape, pressure sensitive tape, water activated tape, heat sensitive tape, hook and loop fasteners, static cling material, magnets, suction/suction cup, microsuction tape, synthetic setae, putty, mechanical coupling, etc. Disposition of the adhesive layer between the rail 2202 or 2204 and a mobile phone case 2200 (or other surface) can enable adhesion of the rail 2202 or 2204 to the mobile phone case 2200 (or a mobile phone, or other surface).

Other embodiments can comprise permanent rails. Permeant rails can be, for instance, molded members of a mobile phone case. For example, rails 2202 and 2204 can be molded at the time of manufacture of the mobile phone case. Permanent or molded rails can possess great durability and reliability with a low risk of separation from a mobile phone, mobile phone case, or any other component to which a rail 2202 or 2204 is molded, such as a wallet, bag, vehicle, cup, plate, camera, case, etc.

A container, such as a container 2400 which will be later discussed in greater detail, can slide onto the rail 2202 or 2204 (or both) for attachment.

FIG. 23 provides an alternate view of the case 2200 and rails 2202 and 2204 depicted in FIG. 22. In this regard, it can be appreciated that the rail 2202 or 2204 can protrude from a surface of the case 2200.

Figure 24:
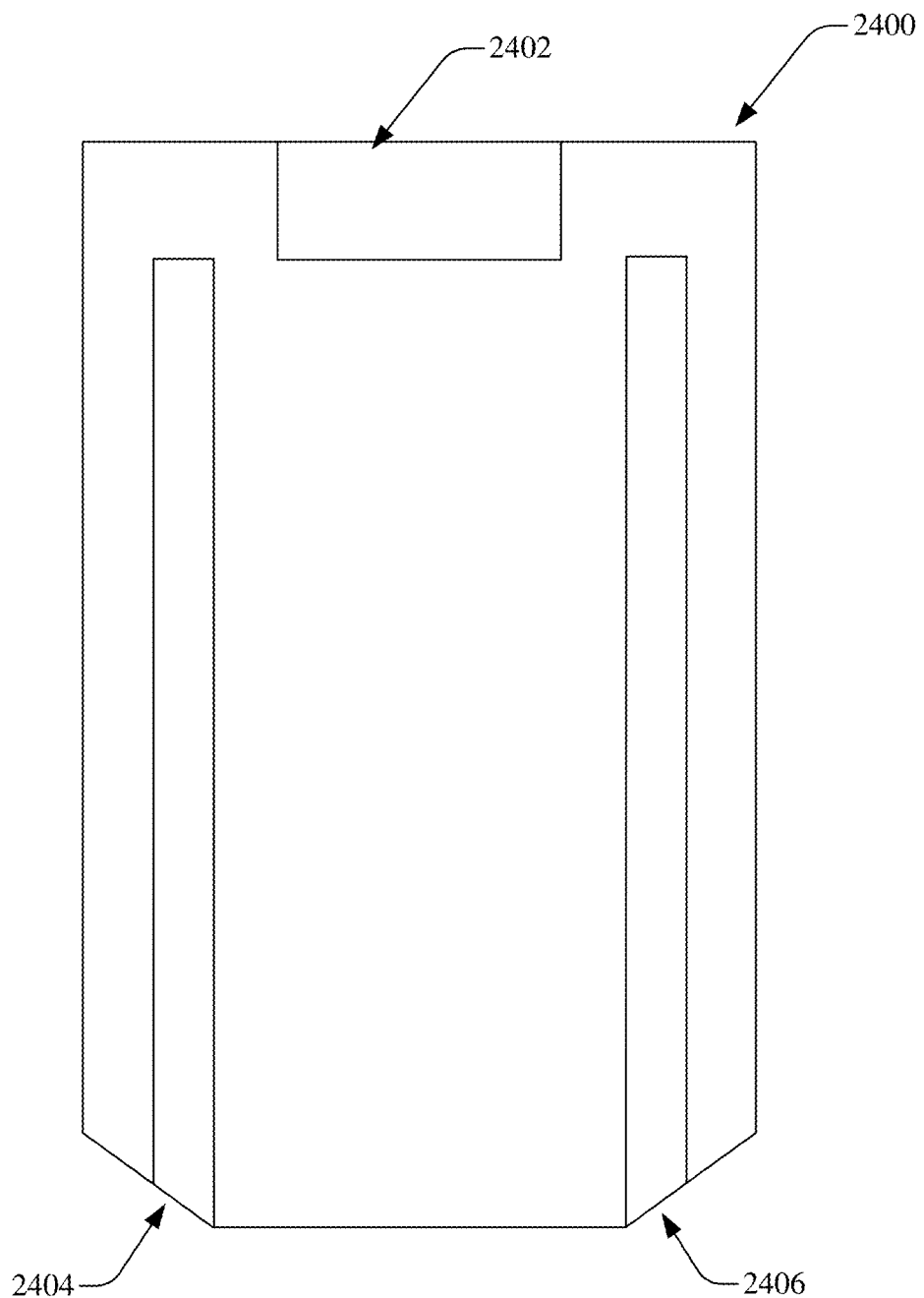
FIG. 24 is a perspective view of a container in accordance with various aspects disclosed herein.

Referring now to FIG. 24, a non-limiting container 2400 is depicted. The container 2400 can comprise a slot 2404 and/or a slot 2406. Slot 2404 and slot 2406 are depicted as the same shape and size as one other but can alternatively be different shapes or sizes from each other. Further, slots 2404 and 2406 can extend fully to an end of the container 2400 or can be located within a perimeter of a surface of the container 2400.

The slot 2404 or slot 2406 can be configured to receive a rail 2202 or a rail 2204. Friction between the rail 2202 or 2204 and the slot 2404 or slot 2406 can removably secure the container 2400 to the rail 2202 or 2204.

According to an embodiment, the container 2400 can slide onto the rail 2202 or 2204. Additionally, the container 2400 can press onto the rail 2202 or 2204. Other attachment implementations between the container 2400 and the rail 2202 or rail 2204 can be utilized. For instance, slider components, fins and slots, snap locking components, or other types and corresponding components, apparatuses or methods for removable adhesion as would be evident to one skilled in the can be utilized. Such configurations can enable easy removal of the container 2400 from the rail 2202 or 2204. Removability of the container 2400 can be beneficial, for instance, to increase mobility of the container 2400, to facilitate easier washing of the container 2400, to use a mobile device without the container 2400 attached, or for other reasons.

The container 2400 is therefore easily adaptable for use with virtually any mobile device, apparatus, or component due to the configurability of the rails 2202 or 2204.

The container 2400 can be configured to receive a drinking apparatus, drinking apparatus component, cleaning apparatus, or other apparatus or component. The container 2400 can comprise a lid 2402. The lid 2402, when in a closed can protect a plurality of chambers (e.g. chambers for a drinking apparatus, drinking apparatus component, cleaning apparatus, etc.) The lid 2402 can be secured to the container 2400 by a hinge, such as a living hinge. Other embodiments utilize ball and socket type attachment(s) between the lid 2402 and the container 2400. Additional lid attachment implementations can be utilized as would be understood by one skilled in the art.

Other embodiments utilize a mobile device case (e.g. case 2200) and a container 2400 as a single apparatus. According to such non-limiting embodiments, the container 2400 is not removable from a mobile device case. Such embodiments can reduce the risk of accidental separation of the container 2400, but can increase thickness vs. a traditional mobile device case not configured to receive a straw.

Figure 25:
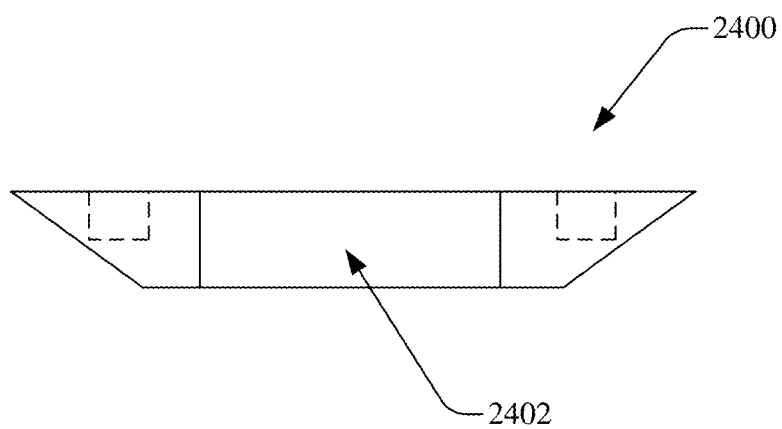
FIG. 25 is a perspective view of a container in accordance with various aspects disclosed herein.
Figure 26:
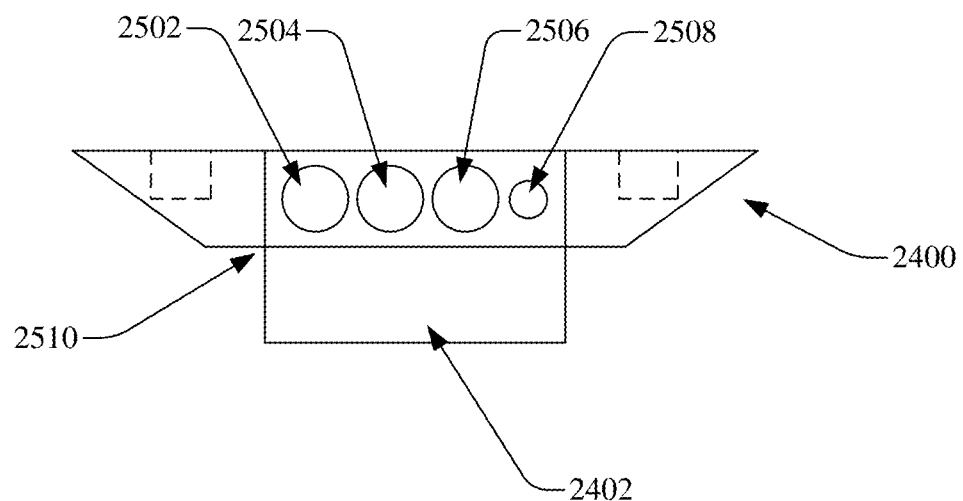
FIG. 26 is a perspective view of a container in accordance with various aspects disclosed herein.

FIGS. 25 and 26 provide an alternative viewing angle of the container 2400. Additionally, FIG. 26 shows the lid 2402 of the container 2400 in an open position. According to an embodiment, the container 2400 and lid 2402 are attached to each other via a hinge 2510 (e.g. a living hinge, ball and socket, or other hinge-type).

The container 2400 can comprise a chamber 2502, chamber 2504, chamber 2506, and/or a chamber 2508. It can be appreciated that the container 2400 can comprise a single chamber or a plurality of chambers. Additionally, the container 2400 can comprise chambers configured for a variety of purposes.

Figure 30:
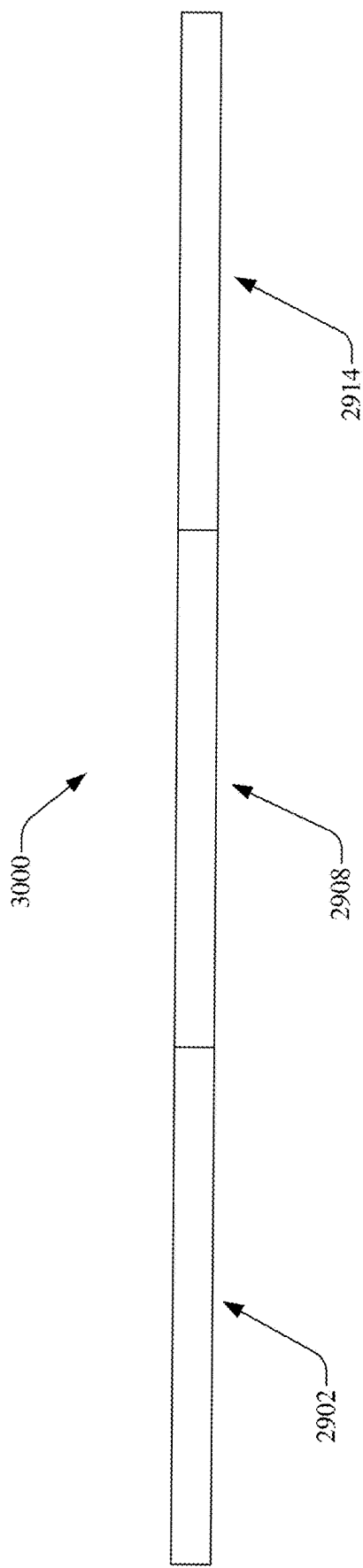
FIG. 30 is a perspective view of a drinking apparatus in accordance with various aspects disclosed herein.

According to an embodiment, chambers 2502, 2504, and 2506 can be configured to removably receive components of a drinking apparatus (e.g. drinking apparatus components 2902, 2908, or 2914 which will be later discussed in greater detail). FIG. 30 illustrates an exemplary drinking apparatus which will be later discussed in greater detail.

Chamber 2508 can be configured to receive a cleaning apparatus. The cleaning apparatus can comprise a bristle or squeegee disk type cleaning apparatus for on-the-go cleaning of the inside or outside of a drinking apparatus or drinking apparatus component. The cleaning apparatus can be removably secured within the chamber 2508 in a manner similar to a straw or drinking apparatus component.

The container 2400 and corresponding chamber(s) can be configured such that at least a portion of a drinking apparatus, drinking apparatus component, or cleaning apparatus respectively protrude from a corresponding chamber when fully inserted into said chamber. In this regard, easy removal of any of the drinking apparatus, drinking apparatus component, or cleaning apparatus can be facilitated. The lid 2402 can be closed to cover these protruding portions and protect against contamination. A locking mechanism (e.g. snap lock) can secure the lid 2402 in a closed position. A gasket can be utilized between the lid 2402 and the container 2400 to additionally safeguard against contamination of the drinking apparatus, drinking apparatus component, or cleaning apparatus.

Figure 27:
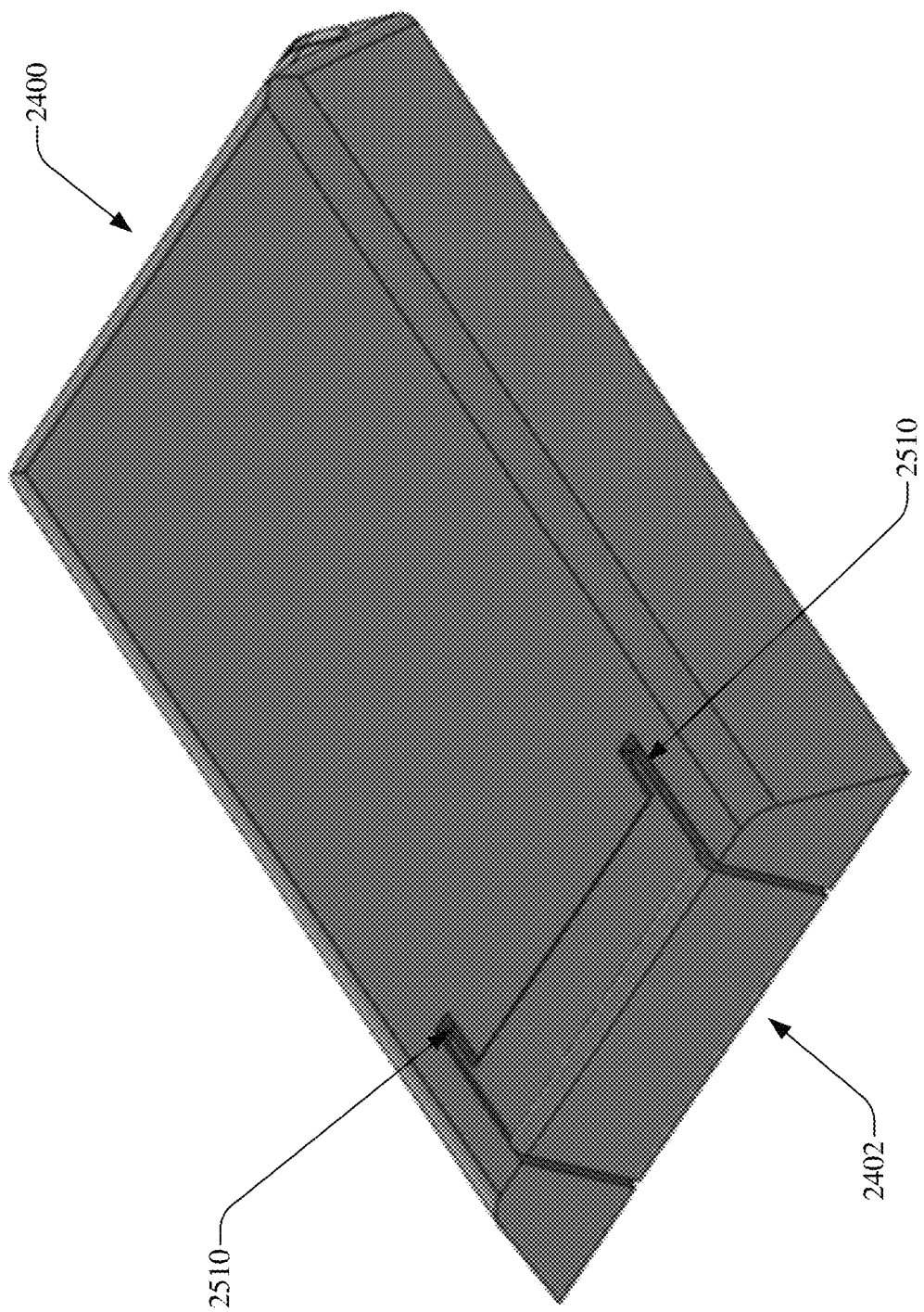
FIG. 27 is a perspective view of a container in accordance with various aspects disclosed herein.

FIG. 27 provides an exemplary container 2400. The lid 2402 is secured to the container 2400 via a pair of hinges 2510 (in this non-limiting embodiment, ball and socket type hinges are utilized).

Figure 28:
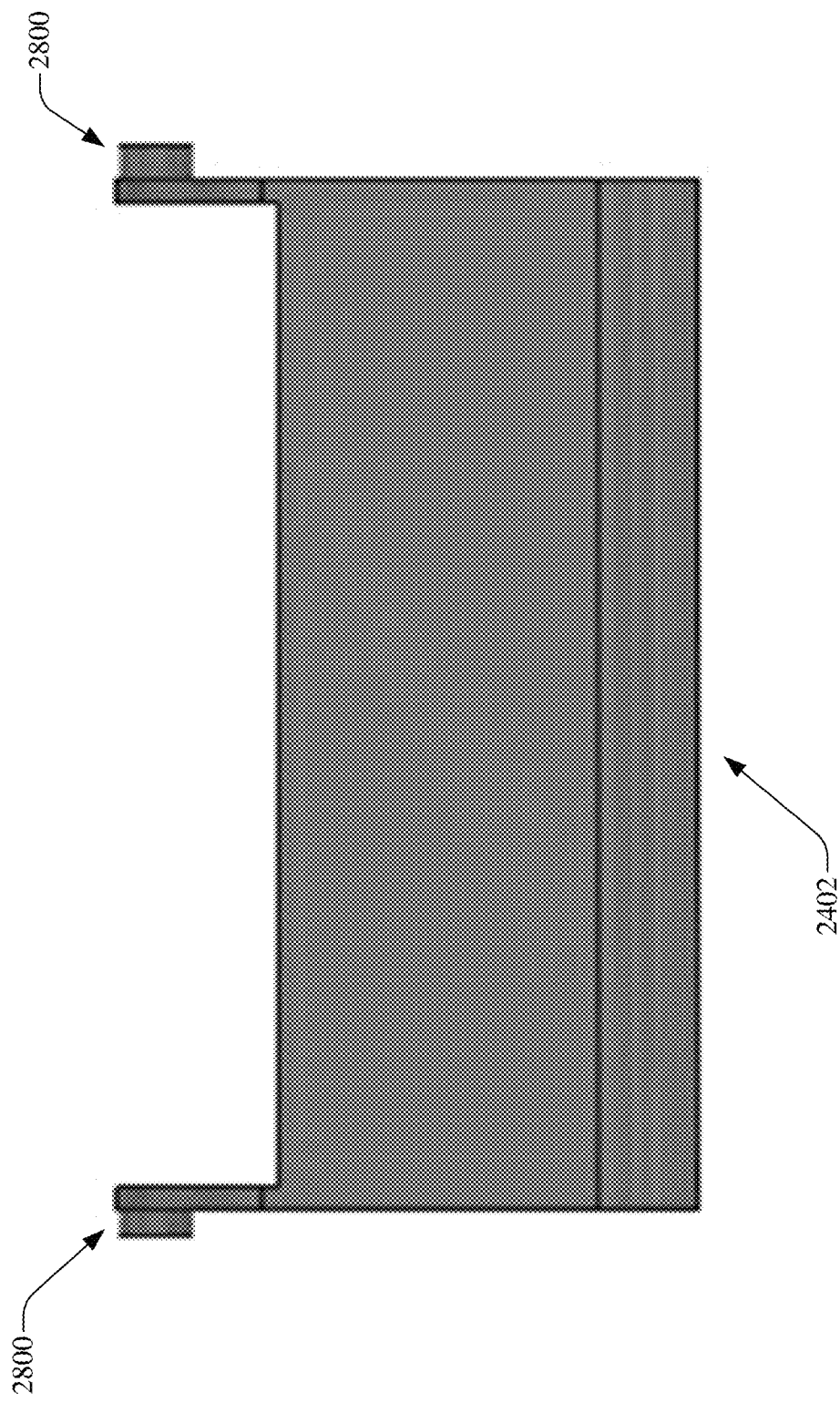
FIG. 28 is a perspective view of a lid component in accordance with various aspects disclosed herein.

FIG. 28 provides an additional view of an exemplary lid 2402 depicted in FIG. 27. In this non-limiting embodiment, a ball and socket type hinge is depicted, with cylindrical protrusion 2800, representing the "ball", which corresponds with a socket (e.g. a cylindrical depression) of a container 2400.

Figure 29:
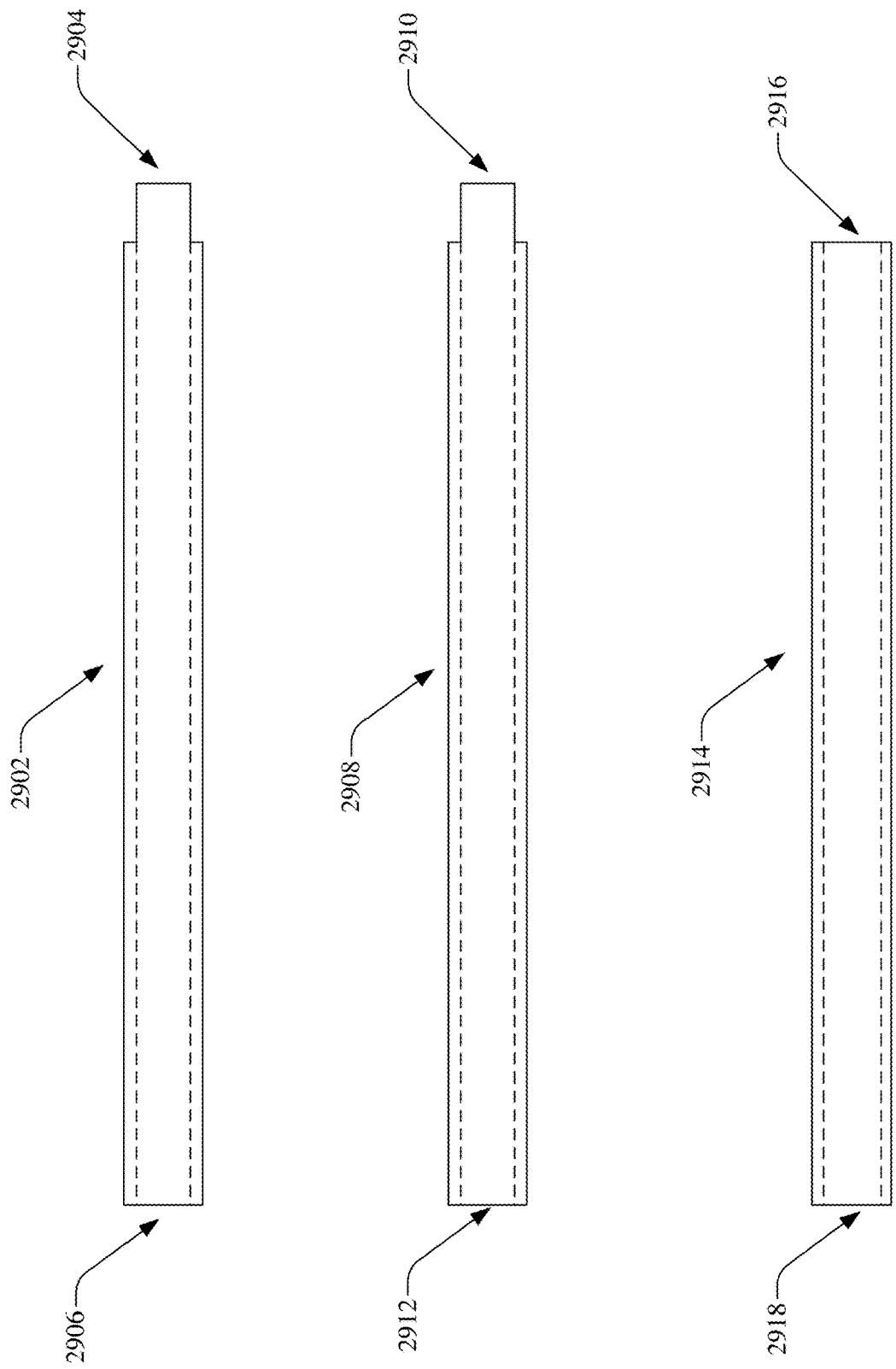
FIG. 29 is a section view of a drinking apparatus in accordance with various aspects disclosed herein.

Turning now to FIGS. 29 and 30, a non-limiting embodiment of a set of drinking apparatus components 2902, 2908, and 2914, which when combined form a drinking apparatus 3000, are depicted. The drinking apparatus component 2902 can comprise a male end 2904 and a female end 2906. Likewise, the drinking apparatus component 2908 can comprise a male end 2910 and a female end 2912. In this regard, the male end 2904 can engage with, for instance, the female end 2912.

According to an embodiment, the engagement between the male end 2904 and the female end 2912 can be removably securable by friction between the male end 2904 and female end 2912. In other embodiments, the engagement can utilize external threads of the male end 2904 which can correspond with internal threads of the female end 2912. Further embodiments can utilize magnetic attraction between the male end 2904 and female end 2912. Magnets can be disposed at the male end 2904 and the female end 2912.

Similarly, one of the female ends (e.g. female end 2916 or female end 2918) of the drinking apparatus component 2914 can be secured to the male end 2910. This way, three drinking apparatus components (2902, 2908, and 2914) can be connected to form drinking apparatus 3000 as shown in FIG. 30. In this regard, a full-size (e.g. nine-inch) drinking apparatus (straw) can be formed.

Alternatively, one of drinking apparatus components 2902 or 2908 can be secured to the drinking apparatus component 2914 without additional attachment of drinking apparatus component(s). In this embodiment, a cocktail glass sized straw can be formed (e.g. six-inch) using a combination of two drinking apparatus components.

It can be appreciated that a variety of combinations of drinking apparatus components can be utilized, ranging from a single drinking apparatus component to a larger quantity of combinations (e.g. 10).

The above combinations of drinking apparatus components utilize exemplary three-inch-long drinking apparatus components, however, each drinking apparatus component need not be three inches nor the same length as one another.

Each of the drinking apparatus components 2902, 2908, or 2914 can be secured within a chamber of the container 2400 (e.g. chamber 2502, 2504, or 2506.)

It can be appreciated that, though depicted as cylindrical, the shape of the drinking apparatus components (and corresponding chambers) can be cylindrical, square, rectangular, or other shapes.

According to yet another non-limiting embodiment, the drinking apparatus component 2902, 2908, or 2914 can comprise a coating. The coating can comprise a reactive material. Such a reactive material can the drinking apparatus pieces to change color if a drug (e.g. flunitrazepam, gamma-hydroxybutyric acid, gamma-butyrolactone, ketamine, alprazolam, diazepam, etc.) is present in a drink to which the corresponding drinking apparatus comes in contact with (e.g. by immersion into said drink). This reaction (e.g. color change) can act as an indicator that a drink is contaminated with some type of identifiable drug. Such an implementation can help identify to a user that an identifiable drug has been added to a drink. Other coatings such as antimicrobial coatings can be utilized to prevent pathogens from surviving on a surface of a drinking apparatus component 2902, 2908, or 2914.

Drinking apparatuses (e.g. straws) are referred to throughout the subject disclosure. The straws used in conjunction with the various embodiments of the subject disclosure are preferably reusable-type straws, though single-use straws could be utilized. The various embodiments can be compatible with more than one type of straw. The straws can be collapsible/extendable or can be fixed in length. The straws can comprise at least one of a number of materials including, but not limited to, silicone, stainless steel, glass, bamboo, paper, acrylic, and food-grade plastics among others.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A straw storage apparatus, comprising:
   a straw container configured to attach to a mobile phone or a mobile phone case;
   a chamber within the straw container configured to removably receive a straw;
   a UV light within or adjacent the chamber, the UV light configured to sterilize the straw; and
   a slider rail attached to the straw container, wherein the slider rail attaches to the mobile phone or the mobile phone case using an adhesive layer disposed between the slider rail and the mobile phone or mobile phone case.

2. The straw storage apparatus of claim 1, wherein the slider rail is configured to removably attach to the straw container.

3. The straw storage apparatus of claim 2, wherein the slider rail is a dove-tail slider.

4. The straw storage apparatus of claim 2, further comprising a second slider rail configured to slidably couple to the straw container, wherein the slider rail is a first slider rail.

5. The straw storage apparatus of claim 2, wherein the slider rail is attached to the mobile phone or the mobile phone case.

6. The straw storage apparatus of claim 2, wherein the slider rail is a component of the mobile phone case.

7. The straw storage apparatus of claim 2, wherein the slider rail frictionally attaches to the straw container.

8. A protective casing, comprising:
   a first case configured to receive a mobile phone;
   a first attachment mechanism disposed on the first case for engagement with a second case, wherein the second case comprises a first chamber configured to accommodate a first straw component, and a UV light configured to sterilize the straw; and
   a slider rail attached to the straw container, wherein the slider rail attaches to the mobile phone or the first or second case using an adhesive layer disposed between the slider rail and the mobile phone or the first or second case.

9. The protective casing of claim 8, wherein the second case comprises a second chamber configured to accommodate a second straw component.

10. The protective casing of claim 9, wherein the first straw component removably attaches to the second straw component to create a straw assembly.

11. The protective casing of claim 9, wherein the first straw component comprises first threads which rotatably engage with second threads of the second straw component.

12. The protective casing of claim 9, wherein the first straw component magnetically attaches to the second straw component.

13. The protective casing of claim 8, further comprising a second chamber configured to receive a straw cleaning apparatus.

14. The protective casing of claim 13, wherein the straw cleaning apparatus comprises bristles configured to clean an interior of the first straw component.

15. The protective casing of claim 13, wherein the straw cleaning apparatus comprises a squeegee configured to clean an interior of the first straw component.

16. A case for transporting a straw, comprising:
   a case body;
   chamber disposed within the case body, configured to receive the straw;
   a living hinge at a first end of the case body;
   a lid attached to the living hinge, configured to protectably cover the straw and the chamber when the lid is in a closed position;
   an attachment slot configured to receive a slider rail;
   a UV light within or adjacent the chamber, the UV light configured to sterilize the straw; and
   a slider rail attached to the case body, wherein the slider rail attaches to the case body using an adhesive layer disposed between the slider rail and the case body.

17. The case of claim 16, further comprising:
   a protective coating disposed on a surface of the straw.

18. The case of claim 17, wherein the protective coating changes color in a presence of a drug.

* * * * *